United States Patent [19]
Tanaka

[11] Patent Number: 5,815,148
[45] Date of Patent: Sep. 29, 1998

[54] MULTI-MEDIA DATA COMMUNICATION SYSTEM HAVING A PLURALITY OF TYPES OF GRAPHICAL USER INTERFACES

[75] Inventor: Mitsumasa Tanaka, Tokyo, Japan

[73] Assignee: NEC Corporation, Tokyo, Japan

[21] Appl. No.: 558,647

[22] Filed: Nov. 16, 1995

[30] Foreign Application Priority Data

Nov. 21, 1994 [JP] Japan ................................... 6-311199

[51] Int. Cl.⁶ ....................................................... G06F 3/14
[52] U.S. Cl. .......................................................... 345/335
[58] Field of Search ................................... 395/333, 334, 395/335, 326, 327, 339, 346, 348, 349, 352, 353, 354, 356, 961, 965; 345/333–335, 326–327, 339, 346, 348–349, 352–354, 356, 961, 965

[56] References Cited

U.S. PATENT DOCUMENTS

| | | | |
|---|---|---|---|
| 5,339,393 | 8/1994 | Duffy et al. | 345/328 |
| 5,404,440 | 4/1995 | Asahi | 345/335 |
| 5,428,730 | 6/1995 | Baker et al. | 345/335 |
| 5,442,745 | 8/1995 | Hirose | 345/335 |
| 5,524,195 | 6/1996 | Clanton, III et al. | 345/327 |
| 5,596,702 | 1/1997 | Stucka et al. | 345/340 |

FOREIGN PATENT DOCUMENTS 0 519 827 A3  12/1992  European Pat. Off. .
0 602 947 A1  6/1994   European Pat. Off. .

OTHER PUBLICATIONS

Nikkei Electronics, Nikkei BP Co. Lit., pp. 82–85, May 23, 1994.

*Primary Examiner*—Matthew M. Kim
*Assistant Examiner*—Crescelle N. dela Torre
*Attorney, Agent, or Firm*—Foley & Lardner

[57] ABSTRACT

In a multi-media data communication system, there are in a server a plurality of user graphic interface (GUI) structures which are different in metaphor image from each other but function to provide the same service. A service request including a metaphor designating data for designating a specific one of the plurality of GUI structures and a terminal identifier of a request issuing terminal equipment of a plurality of terminal equipments is issued from the request issuing terminal equipment to the server via a bidirectional communication line. The server determines whether the request issuing terminal equipment is allowed to receive a service and whether the service request includes the metaphor designating data when it is determined that the request issuing terminal equipment is allowed to receive service. When the service request includes the metaphor designating data, the server transmits the specific one of the plurality of GUI structures to the request issuing terminal equipment in response to the service request. The request issuing terminal equipment designates a specific service using the transmitted GUI structure transmitted from the server and the server provides the specific service designated based on the transmitted GUI structure by the request issuing terminal equipment. In this manner, the request issuing terminal equipment can receives the specific service from the server.

20 Claims, 20 Drawing Sheets

MULTI-MEDIA DATA COMMUNICATION SYSTEM HAVING A PLURALITY OF TYPES OF GRAPHICAL USER INTERFACES

BACKGROUND OF THE INVENTION

1. Field of the Invention

The present invention relates to a multi-media data communication system in which a server for providing various types of service and a terminal equipment of a user are connected to each other by a bidirectional communication line, more particularly to a multi-media data communication system in which the server provides a type of service requested from the user via one of a plurality of types of graphical user interface (GUI) of the terminal equipment.

2. Description of Related Art

There is conventionally known a multi-media data communication system. In the multi-media data communication system, a server and terminal equipments are connected via a bidirectional communication line. If a user wants to receive a type of service, it is required for a user to transmit various requests for receiving various types of service from a terminal equipment. For instance, if the user wants video on demand service, the user is required to issue the type of service and the title of a video information to the server. The server provides one of various types of service such as video on demand service and home shopping service to a terminal equipment in response to the request.

In a case of requesting to the server, the request is generally transmitted from the terminal equipment to the server via a type of GUI on the terminal equipment side. That is, the type of GUI displays on a display section of the terminal equipment a metaphor image of service screen including images of buttons corresponding to various requests. When it is detected based on the button position in the metaphor image of service screen that one button is operated, the type of GUI transmits the request corresponding the operated button to the server. Such a multi-media data communication system is described in a reference 1 (for example, Nikkei Electronics, Nikkei BP Co. Lit., pp. 82–85, May 23, 1994). However, in a conventional multi-media data communication system, one type of GUI having a hierarchical structure is only provided for a desired type of service. For this reason, there is a problem in that the service screen does not fit to the user need so that the user can not easily operate buttons on the service screen. Also, there is a case that the user wants to change the metaphor image of service screen so as to produce a user's original metaphor image of service screen. Further, in the reference 1, how the type of GUI is established is not described.

SUMMARY OF THE INVENTION

Therefore, an object of the present invention is to provide a multi-media data communication system in which a user of a terminal equipment can select a user friendly one from among a plurality of types of GUI prepared in advance which are different from each other in metaphor image but can perform substantially the same function.

Another object of the present invention is to provide a multi-media data communication system in which the user can change or customize the metaphor image of service screen.

Still another object of the present invention is to provide a method and apparatus for establishing a metaphor image of service screen on a more simplified terminal equipment with less load of a bidirectional communication line and in a multi-media data communication system.

A multi-media data communication system of the present invention includes a server having a plurality of user graphic interface (GUI) structures which are different in metaphor image from each other but function to provide the same service, for transmitting a specific one of the plurality of GUI structures in response to an inputted service request including an identifier for designating one GUI structure, and for providing a specific service designated based on the transmitted GUI structure, and a plurality of terminal equipments connected to the server via a bidirectional communication line, wherein a request issuing terminal equipment of the plurality of terminal equipments issues the service request to the server via the bidirectional communication line, receives the GUI structure transmitted from the server to designate the specific service using the transmitted GUI structure, and receives the specific service from the server.

Since receiving a service request with no data for designating one GUI structure when the request issuing terminal equipment receives a service from the server for the first time, the server transmits a default one of the plurality of GUI structures. Each of the plurality of GUI structures has an identifier for designating the GUI structure, and when receiving the GUI structure transmitted from the server, the request issuing terminal equipment stores the GUI structure designating data contained in the transmitted GUI structure, to thereby enable the request issuing terminal equipment to use the specific GUI structure.

The GUI structure may be transmitted collectively. However, If each of the plurality of GUI structures has a hierarchical structure composed of a plurality of layers, each of which has a plurality of selection paths to each of which a set of image data and service program corresponding to the image data is provided, the communication system may includes the server sequentially transmits sets of image data and service program for the plurality of layers in a specific one of the plurality of GUI structures in response to an inputted service request including GUI designating data for designating one GUI structure and selections in each of the plurality of layers, and provides a specific service designated based on the transmitted GUI structure, and the request issuing terminal equipment issues the service request to the server via the bidirectional communication line, sequentially receives the sets of image data and service program for the plurality of layers in the specific one of the plurality of GUI structures to execute the selections for the specific service using the received sets, and receives the specific service from the server. In this case, an image data for buttons may be transmitted collectively once or each time the set of image data and service program for one layer is transmitted, an image data of the button for the layer may be transmitted.

In order to provide a service using a user friendly type of graphic user interface (GUI) in a multi-media data communication system, a server has a plurality of GUI structures which are different in metaphor image from each other but function to provide the same service. When there is issued a service request including a metaphor designating data for designating a specific one of the plurality of GUI structures and a terminal identifier of a request issuing terminal equipment of a plurality of terminal equipments from the request issuing terminal equipment to the server via a bidirectional communication line, the server determines whether the request issuing terminal equipment is allowed to receive a service and whether the service request includes the metaphor designating data when it is determined that the request issuing terminal equipment is allowed to receive service. When it is determined that the service request includes the metaphor designating data, the server transmits the specific one of the plurality of GUI structures to the request issuing terminal equipment. The request issuing terminal equipment designates a specific service using the transmitted GUI structure transmitted from the server and the server provides to the request issuing terminal equipment the specific service designated based on the transmitted GUI.

The GUI structure used by the terminal equipment can be changed to easily operate selection buttons. In this case, a metaphor changing request is issued from the request issuing terminal equipment issues to the server. The server transmits a metaphor changing structure to the request issuing terminal equipment together with a list of identifiers of the plurality of GUI structures in response to the metaphor change request. A user of the terminal equipment selects the most desirable type of GUI using the list of identifiers of the plurality of GUI structures and the metaphor changing structure and informs it to the server. The server transmits to the request issuing terminal equipment a new GUI structure finally designated.

In the multi-media data communication system, an additional GUI structure may registered in the server. This operation may be executed on the server side or from the terminal equipment. Thus, the user of the terminal equipment can establish an original and customized GUI.

DESCRIPTION OF THE PREFERRED EMBODIMENTS

A multi-media data communication system of the present invention will be described in detail with reference to the accompanying drawings.

Figure 1:
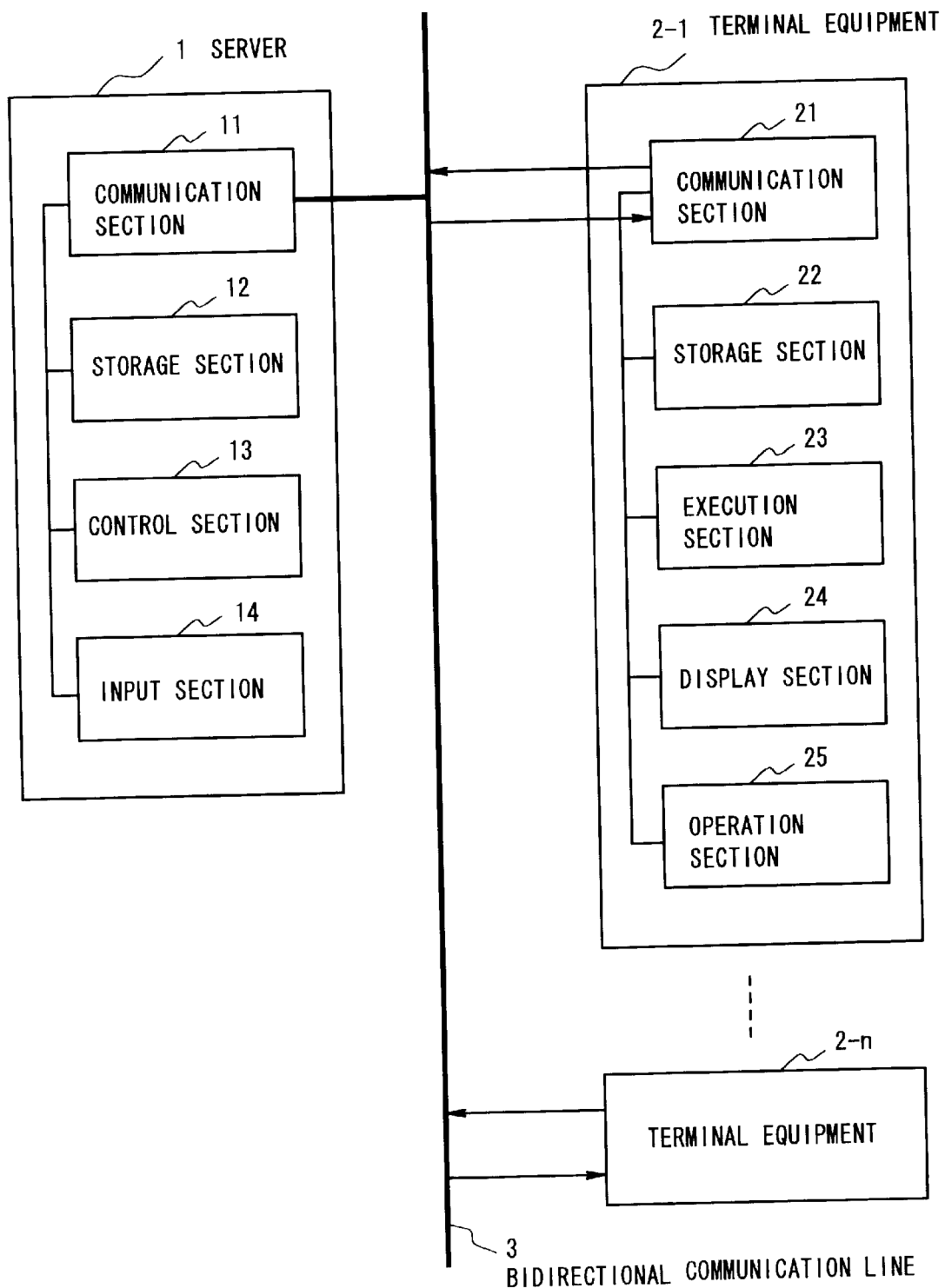
FIG. 1 is a block diagram of a multi-media data communication system according to an embodiment of the present invention.

The structure of a multi-media data communication system according to an embodiment of the present invention will be first described below. FIG. 1 is a block diagram of the embodiment of the present invention. Referring to FIG. 1, the multi-media data communication system includes a server 1 and a plurality of terminal equipments 2-1 to 2-n connected to the server 1 via a bidirectional communication line 3. The server 1 is composed of a communication section 11 used for communication with the plurality of terminal equipments 2-1 to 2-n via the bidirectional communication line 3, a storage section 12 for storing data, tables and programs, a control section 13 for controlling the whole of server 1 and executing processing responsive to each of requests from the plurality of terminal equipments 2-1 to 2-n, and an input section 14 for inputting data and instructions. The terminal equipments 2-1 to 2-n are the same structure. For instance, the terminal equipment 2-1 is composed of a communication section 21 having an identifier peculiar to itself, and communicating with the server 1 via the bidirectional communication line 3, a storage section 22 for storing data and programs, an execution section 23 for executing the program stored in the storage section 22, a display section 24 including a CRT, for example, and displaying various selection screens and service provided by the server 1 such as video information, and an operation section 25 including a keyboard and a mouse, for example, and inputting instructions and data.

Figure 2:
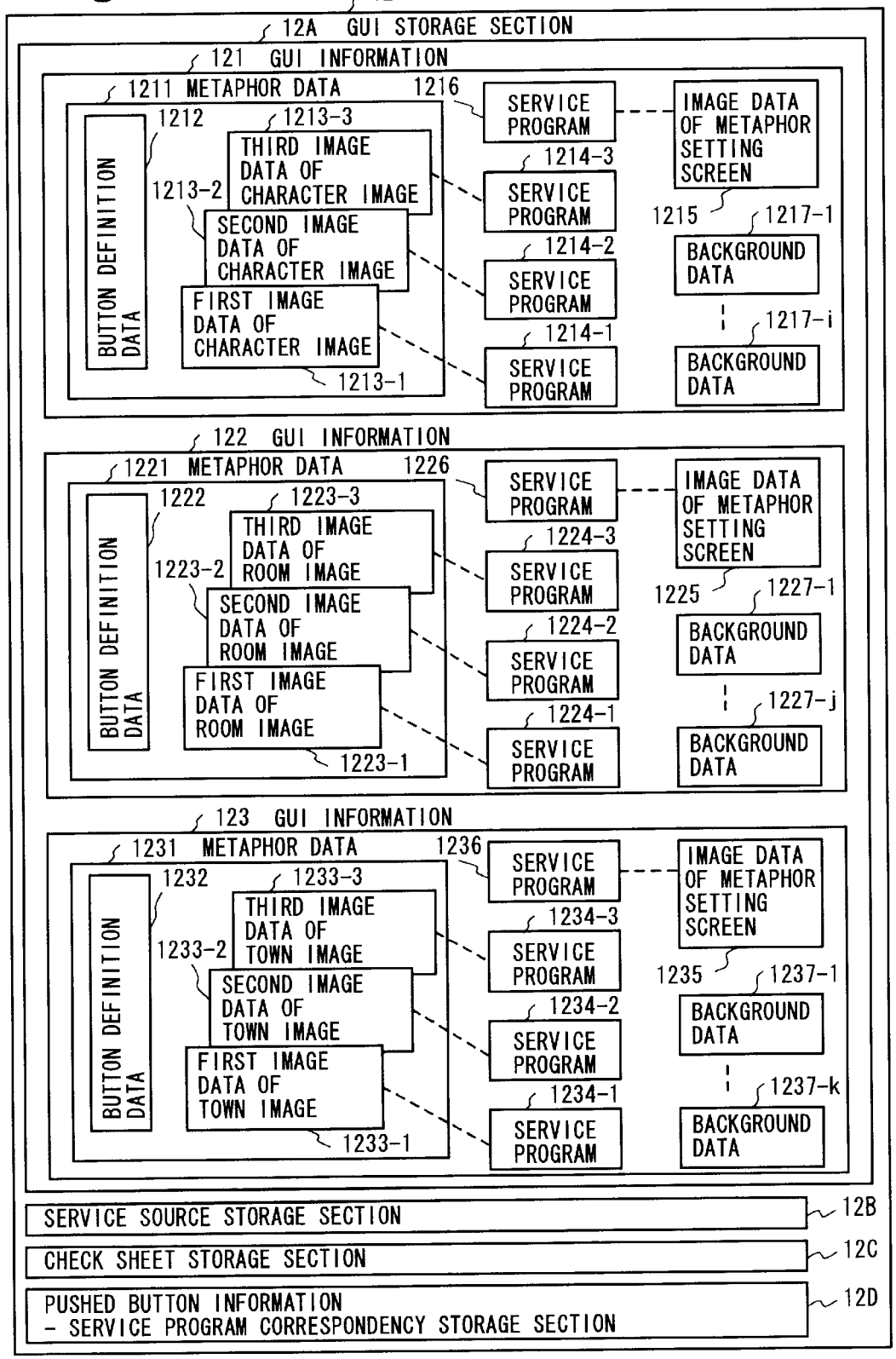
FIG. 2 is a block diagram of an example of structure of a storage section 12 in a server shown in FIG. 1.

FIG. 2 shows the detail of storage section 12 of the server 1. Referring to FIG. 2, the storage section 12 is composed of a graphic user interface (GUI) storage section 12A for storing GUI information for a plurality of types of GUI, e.g., three types of GUI in the embodiment, each of which has a hierarchical structure, a service source storage section 12B for storing sources of services to be provided, a check sheet storage section 12C for storing a check sheet indicative of the plurality of types of GUI registered already in the server 1 by identifiers or names of the plurality of types of GUI, and a pushed (operated) button information—service program correspondency storage section 12D storing the hierarchical structure of each of the plurality of types of GUI and indicating the service program to be transmitted next.

In the GUI storage section 12A are stored three types of GUI information 121, 122, 123 which are used for establishing on the display section 24 of the terminal equipment. In this embodiment, the established GUI is of a character image type, a room image type, and a town image type.

Thus, the plurality of types of GUI are different in metaphor image but can perform substantially the same function. Each of the plurality of types of GUI has the hierarchical structure as described above, the structure has a plurality of levels, e.g., three levels in the embodiment. The GUI information 121 stores data and programs for the character image type of GUI. The GUI information 121 includes a metaphor data 1211 which is composed of a plurality of image data for the hierarchical structure of the character image type of GUI and a button definition data 1212 having data for defining button images presented by the plurality of image data. The selection screen established by one image data of a level of the hierarchical structure has a plurality of selection paths and an image data of the next level is provided for each of the plurality of selection paths. In the figure, however, for simplification of illustration, a first image data 1213-1 of the first level of the hierarchical structure, a second image data 1213-2 of the second level, and a third image data 1213-3 of the third level are only shown for the character image type of GUI. The same matter is applied to the GUI information 122 and 123. The GUI information 121 further includes a plurality of service programs, e.g., first to third service programs 1214-1 to 1214-3 respectively corresponding to the first to third image data 1213-1 to 1213-3 of the character image type of GUI, and a plurality of background data 1217-1 to 1217-i which are used for the background of the character image type of GUI. An image data 1215 and a service program 1216 corresponding to the image data 1215 of the GUI information 121 are used for setting a metaphor image. The GUI information 122 stores data and programs for the room image type of GUI. The GUI information 122 includes a metaphor data 1221 which is composed of a plurality of image data for the room image type of GUI and a button definition data 1222 having data for defining button images presented by the plurality of image data. In the figure, however, for simplification of illustration, only a first image data 1223-1, a second image data 1223-2, and a third image data 1223-3 are shown for three levels of the room image type of GUI. The GUI information 122 further includes a plurality of service programs, e.g., first to third service programs 1224-1 to 1224-3 respectively corresponding to the first to third image data 1223-1 to 1223-3 of the room image type of GUI, an image data 1225 for a metaphor setting screen, a service program 1226 corresponding to the image data 1225, and a plurality of background data 1227-1 to 1227-j which are used for the background of the room image type of GUI. The GUI information 123 stores data and programs for the town image type of GUI. The GUI information 123 includes a metaphor data 1231 which is composed of a plurality of image data for the town image type of GUI and a button definition data 1232 having data for defining buttons presented by the plurality of image data. In the figure, however, for simplification of illustration, only a first image data 1233-1, a second image data 1233-2, and a third image data 1233-3 are shown for three levels of the town image type of GUI. The GUI information 123 further includes a plurality of service programs, e.g., first to third service programs 1234-1 to 1234-3 respectively corresponding to the first to third image data 1233-1 to 1233-3 of the town image type of GUI, an image data 1235 for a metaphor setting screen, a service program 1236 corresponding to the image data 1235, and a plurality of background data 1237-1 to 1237-k which are used for the background of the town image type of GUI.

Figure 6:
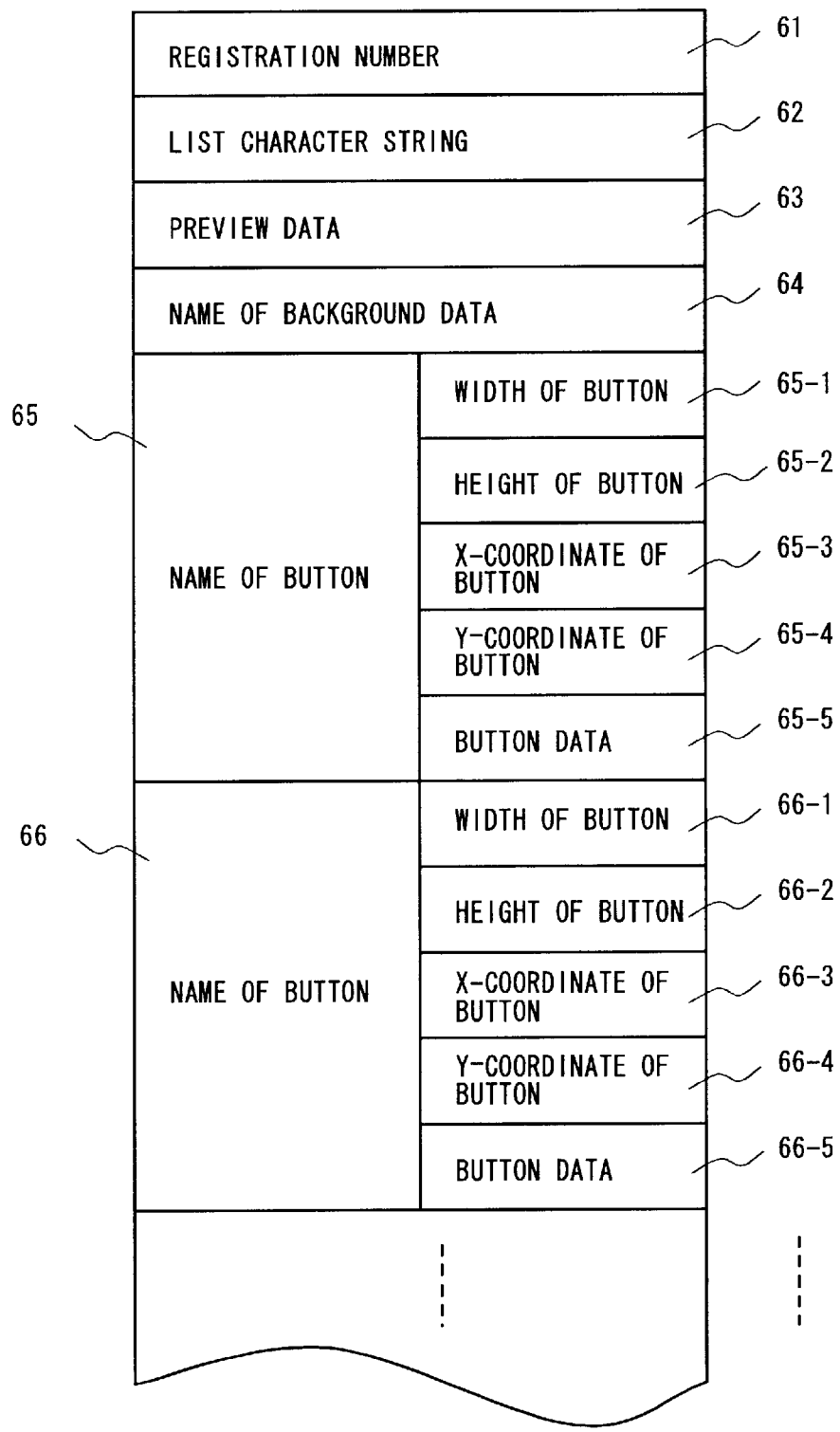
FIG. 6 is a diagram indicative of an example of button definition data.

FIG. 6 is a diagram showing a structure of the button definition data 1212, 1222, or 1232. The button definition data is composed of a registration number 61, a list character string 62, a preview data 63, a name of background data 64, the names of the buttons 65, 66, . . . , the widths of the buttons 65-1, 66-1, . . . , the heights of buttons 65-2, 66-2, . . . , X-coordinate values 65-3, 66-3, . . . of the upper left corners of the buttons, Y-coordinate values 65-4, 66-4, . . . of the upper left corners of the buttons, button data 65-5, 66-5, . . . . The registration number 61 indicates the order in which the corresponding GUI information including the button definition data is registered in the server 1. The list character string 62 is a character string indicating the corresponding type of GUI which is established based on the GUI information including the button definition data. In the embodiment, the list character strings 62 of "character image", "room image" and "town image" are given the types of GUI which are established based on the GUI information 121, 122, and 123, respectively. The preview data 63 indicates the name of image data displayed in a preview section 53 of a metaphor setting screen. The name of the background data 64 indicates the name of background displayed in the background section of the selection screen. The names of buttons 65, 66, . . . indicate the names given the buttons displayed on the metaphor setting screen and selection screen. The button data 65-5, 66-5, . . . indicate graphic data pasted on the buttons.

Figure 8:
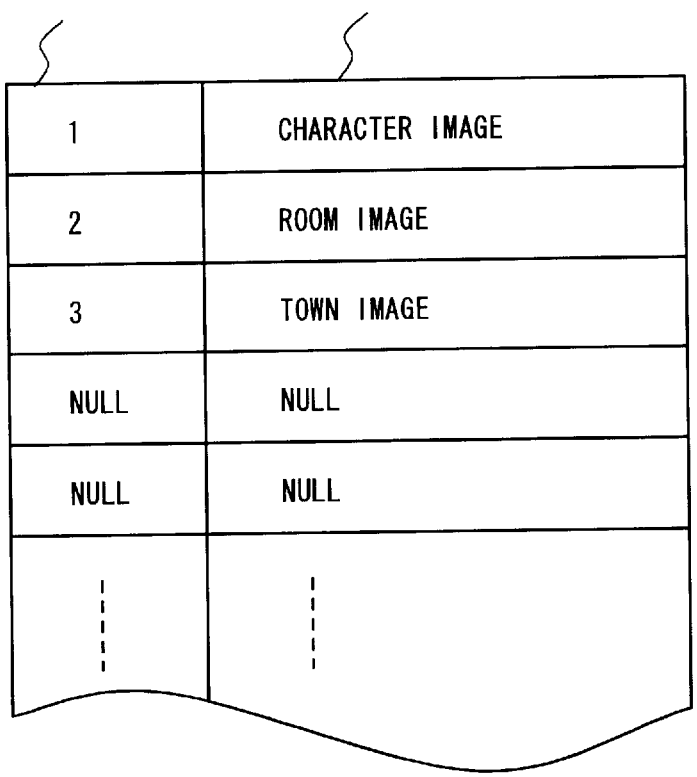
FIG. 8 is a diagram showing an example of a check sheet stored in a check sheet storage section 12C of FIG. 2.
Figure 20:
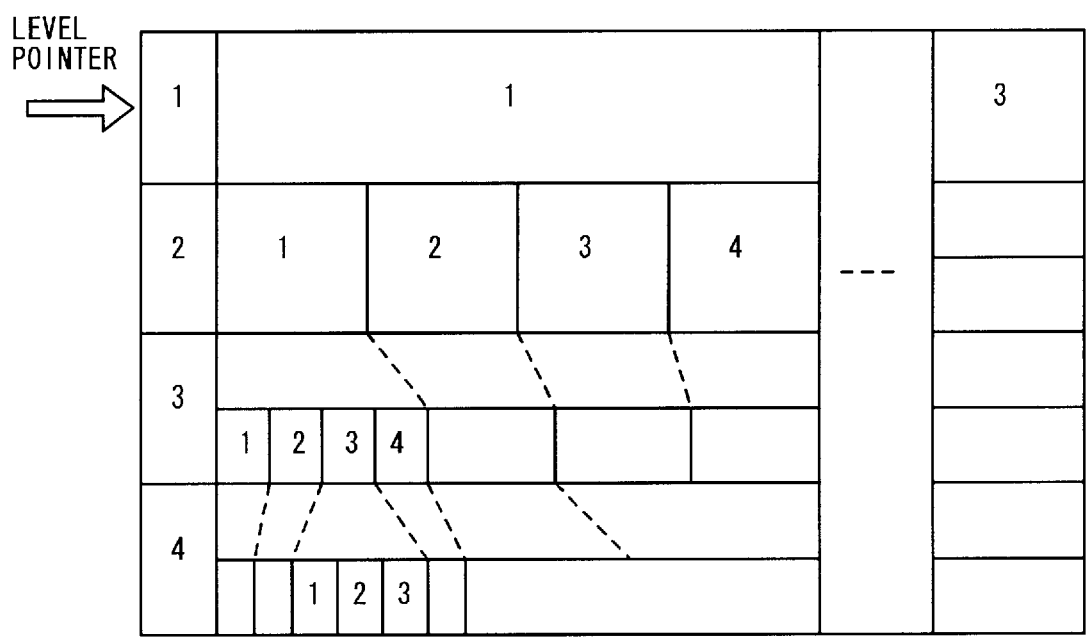
FIG. 20 is a diagram showing pushed button information—service program correspondency.

In a service source storage section 12B are stored service sources such as video movies and game programs to be delivered to the terminal equipments 2-1 to 2-n. In a check sheet storage section 12C is stored a check sheet as shown in FIG. 8. The check sheet has information for managing the types of GUI information registered in the storage section 12. In the check sheet are stored a registration number 81 used to investigate the total number of types of GUI information registered in the storage section 12 and the list character strings indicative of types of GUI established based on the types of GUI information having each of the registration numbers. The registration number and list character string are the same as those written in the button definition data. In a pushed button information—service program correspondency storage section 12D is stored information relating the pushed button information to the service program stored in the storage section 12 of the server 1, as shown in FIG. 20. In FIG. 20, numbers are assigned to the selection paths of the selection screen in each level of the hierarchical structure of each of the plurality of types of GUI. In FIG. 20, the main level ① identifies the types of GUI, the first level ② the kind of the service to be provided, the second level ③ the category of the service, and the third level ④ the title in the embodiment. A level pointer proceeds from ① to ④ as a button on the selection screen is operated. The control section 13 of the server 1 manages the state of each terminal equipment using the level pointer and the operated button information and determines the set of image data and service program to be transmitted next.

Figure 9:
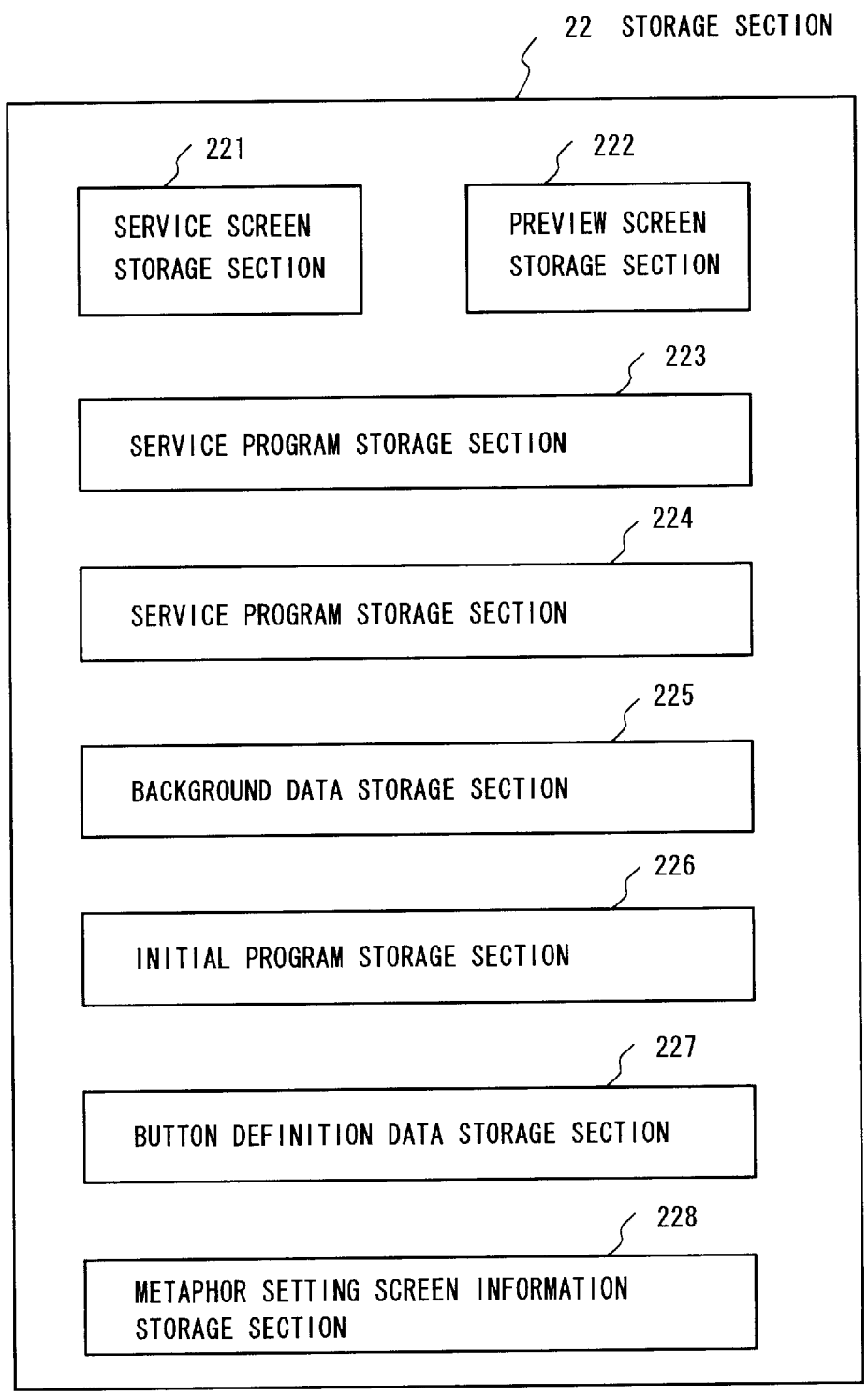
FIG. 9 is a block diagram showing an example of structure of a storage section 22 of a terminal equipment of FIG. 1.

FIG. 9 shows the structure of the storage section 22 of the terminal equipment. Referring to FIG. 9, the storage section 22 includes a service screen storage section 221, a preview screen storage section 222, service program storage sections 223 and 224, a background data storage section 225, an initial program storage section 226, a button definition data storage section 227, and a metaphor setting screen information storage section 228. The initial program storage section 226 and the button definition data storage section 227 are always present in the storage section 22. The service screen storage section 221, the preview screen storage section 222, the service program storage sections 223 and 224, the background data storage section 225, and the metaphor setting screen information storage section 228 are assigned with areas of the storage section 22, if necessary. In the initial program storage section 226 is stored an initial program for transmitting a line connection request to the server 1 and receiving information from the server 1. In the service screen storage section 221 is stored an image data to be displayed to establish a service selection screen. In the preview screen storage section 222 is stored an image data to be displayed to establish the preview section. In the service program storage section 223 and 224 are stored service programs transmitted from the server 1 and in the background data storage section 225 is stored a background data transmitted from the server 1. In the metaphor setting screen information storage section 228 is stored metaphor setting screen information transmitted from the server 1.

Figure 10:
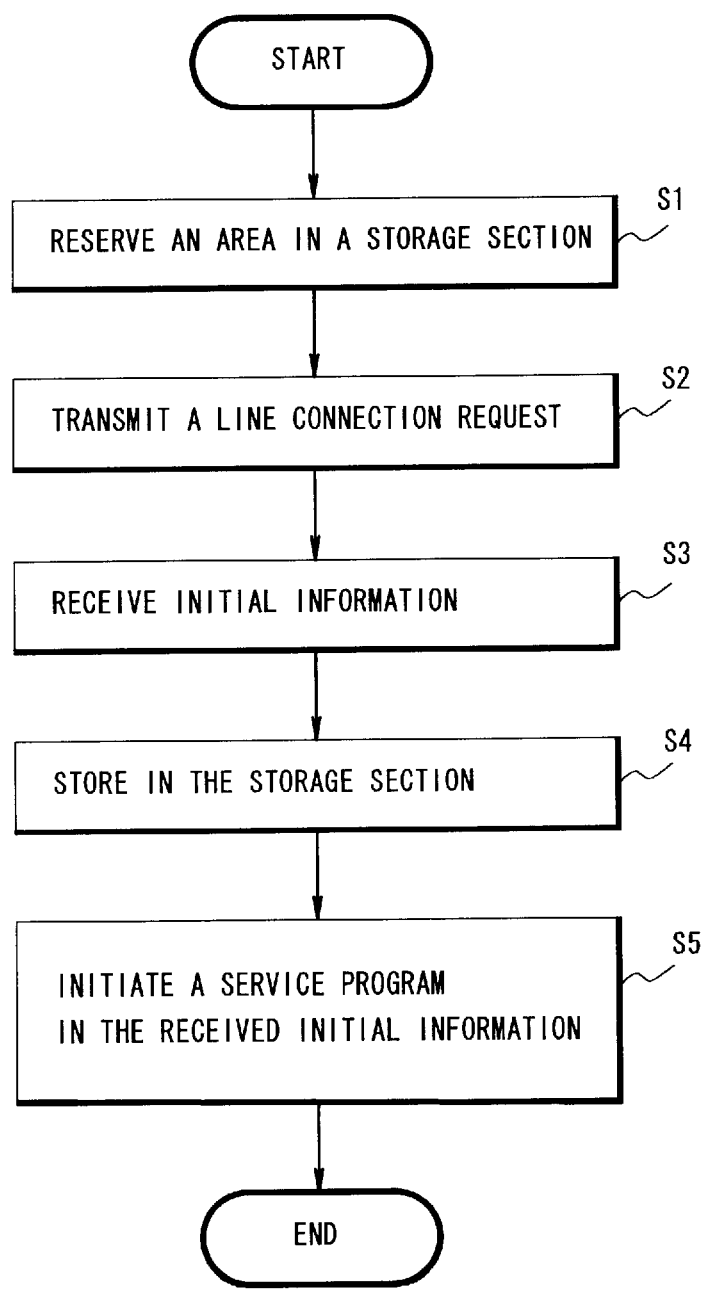
FIG. 10 is a flow chart showing an example of transmission processing of an initial program.
Figure 11:
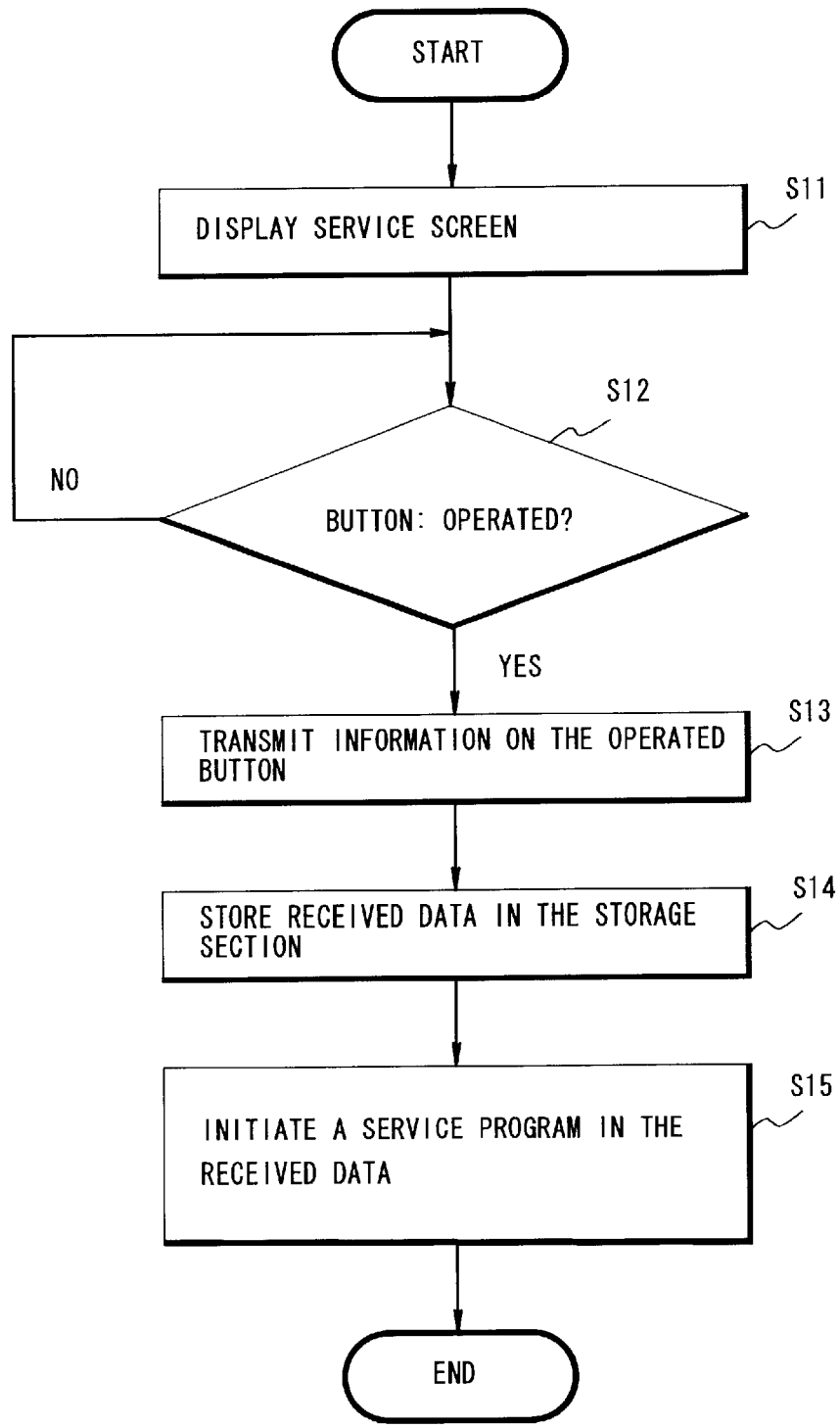
FIG. 11 is a flow chart showing an example of transmission processing of a service program (except for a final stage and a metaphor setting service program)
Figure 12:
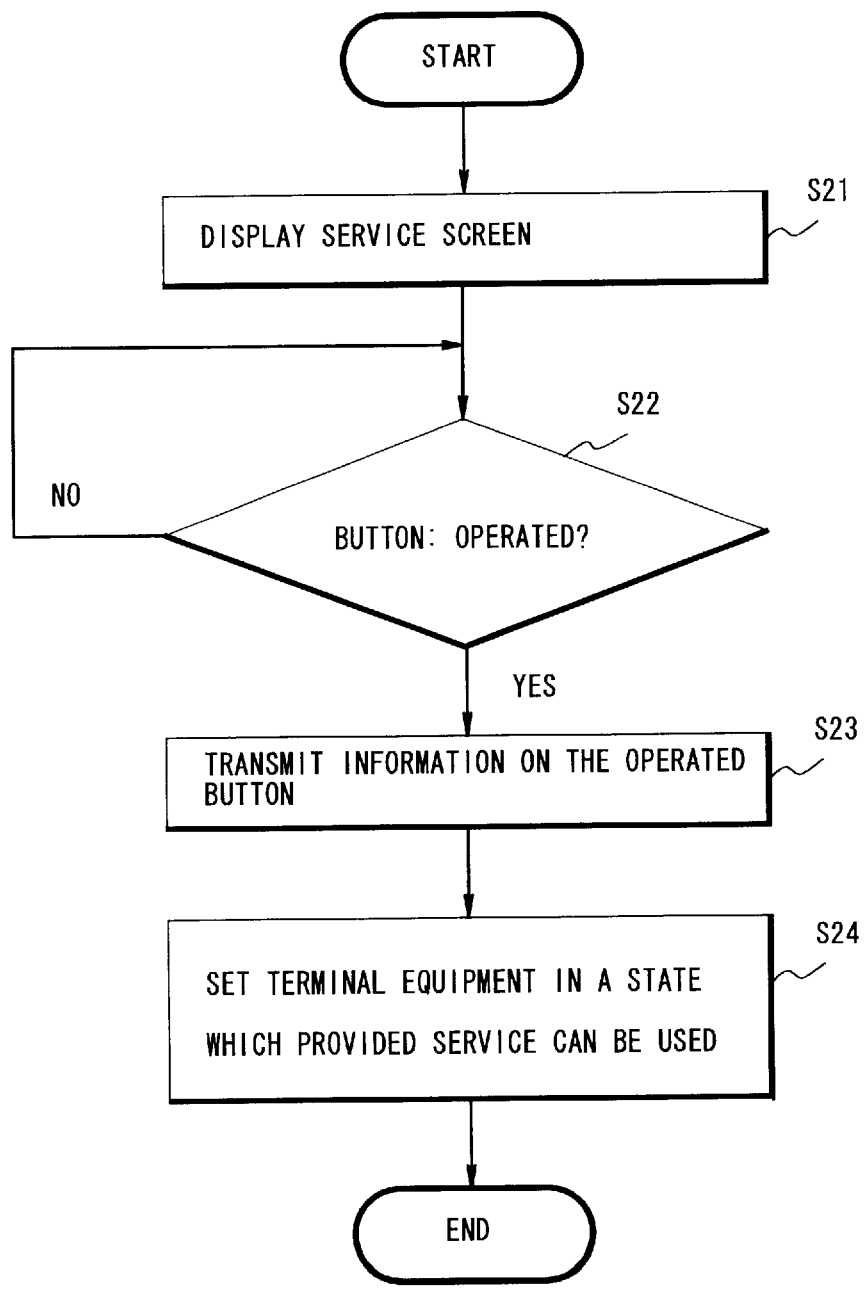
FIG. 12 is a flow chart showing an example of processing of the final stage of service program.
Figure 13:
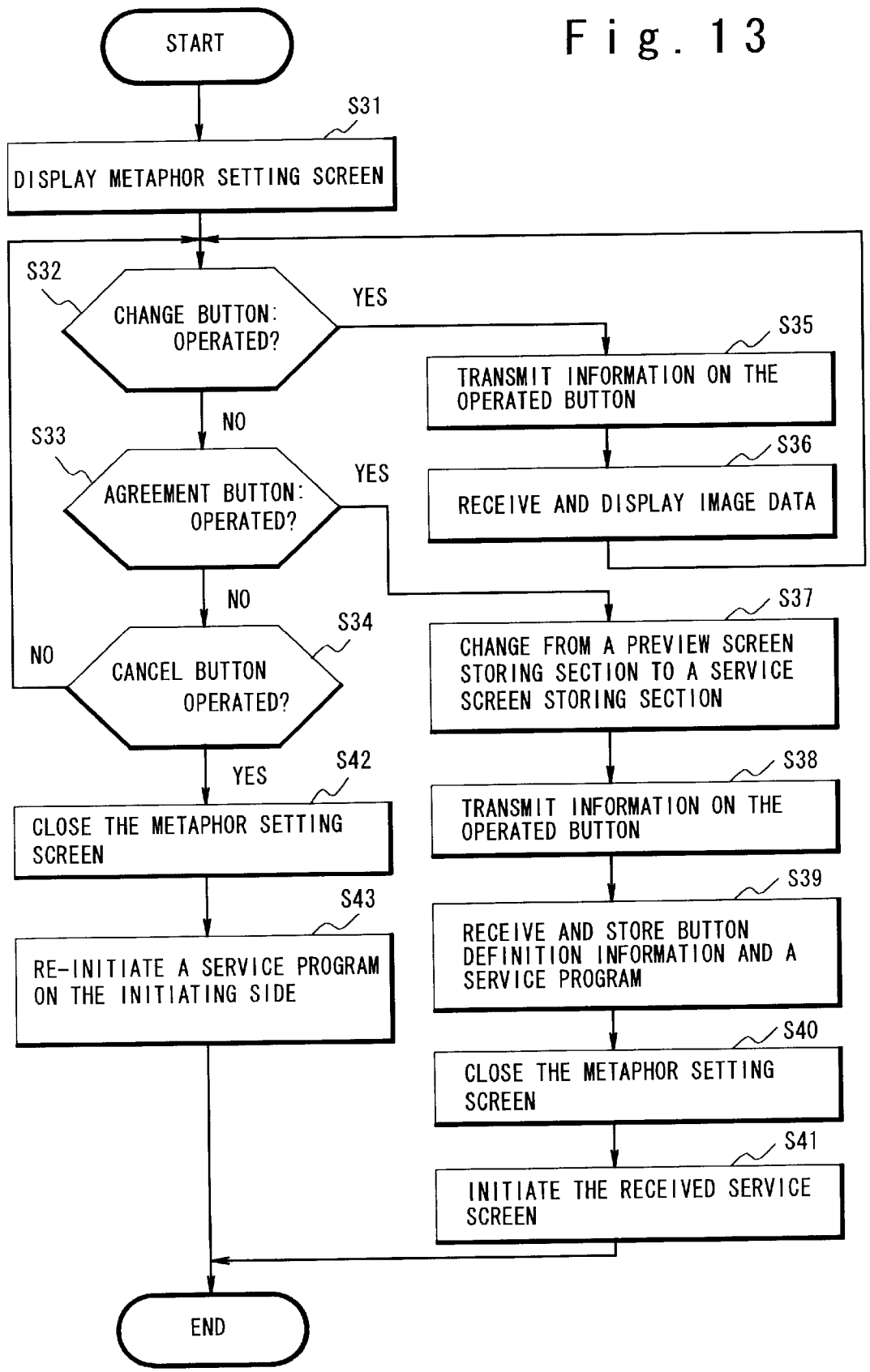
FIG. 13 is a flow chart showing an example of processing of the metaphor setting service program.
Figure 14:
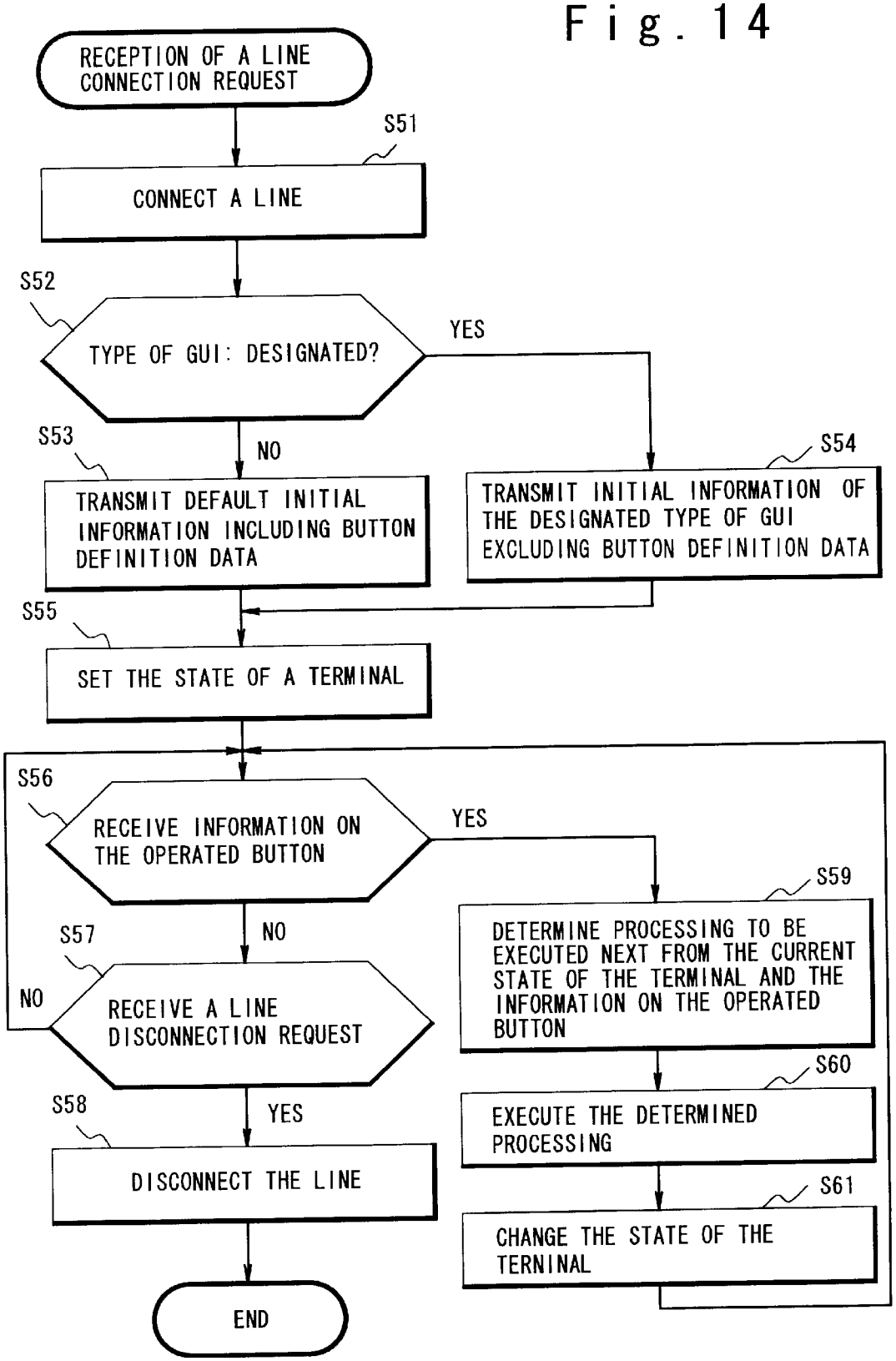
FIG. 14 is a flow chart showing an example of processing on receiving a line connection request by the server.
Figure 15:
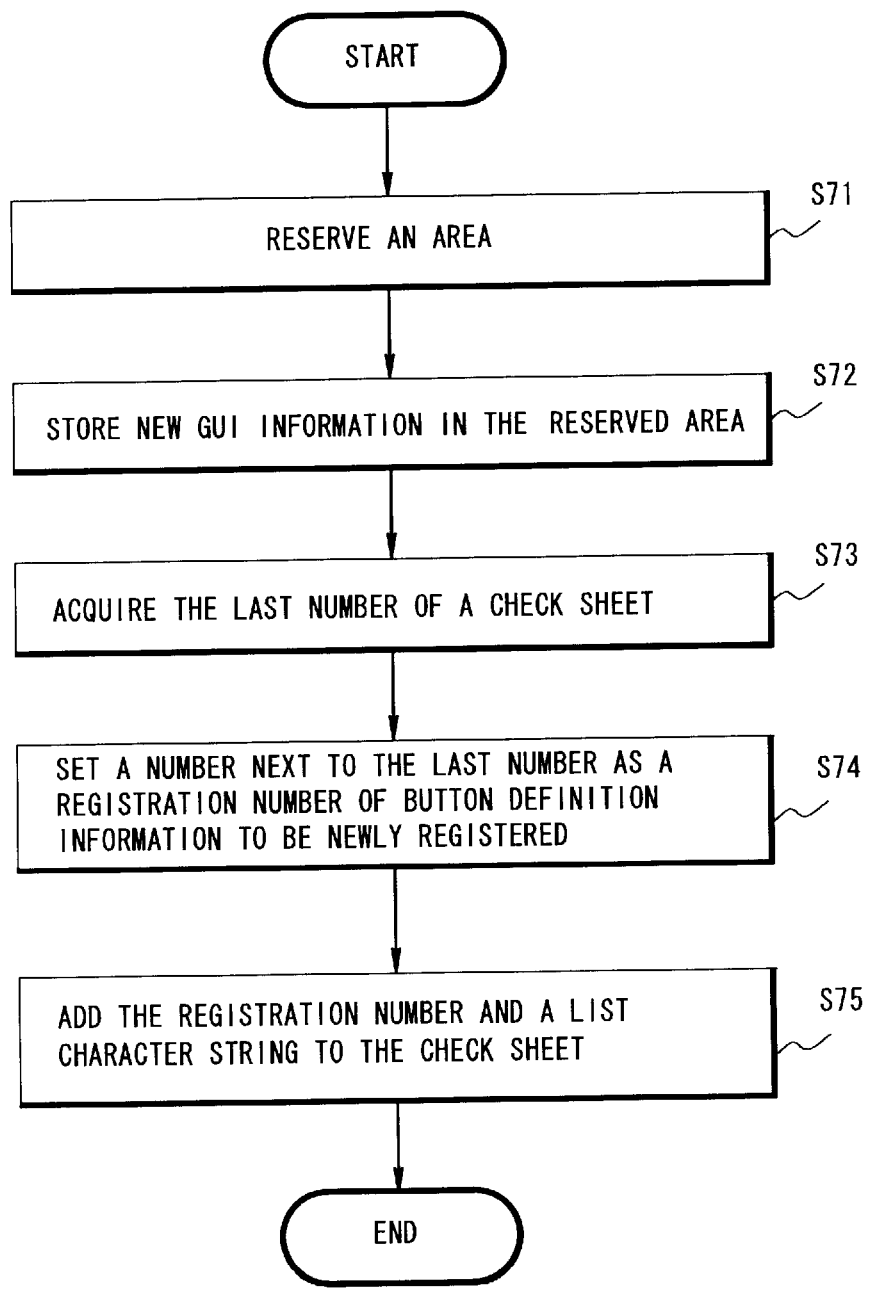
FIG. 15 is a flow chart showing an example of processing in the server when a new type of GUI information is registered.
Figure 16:
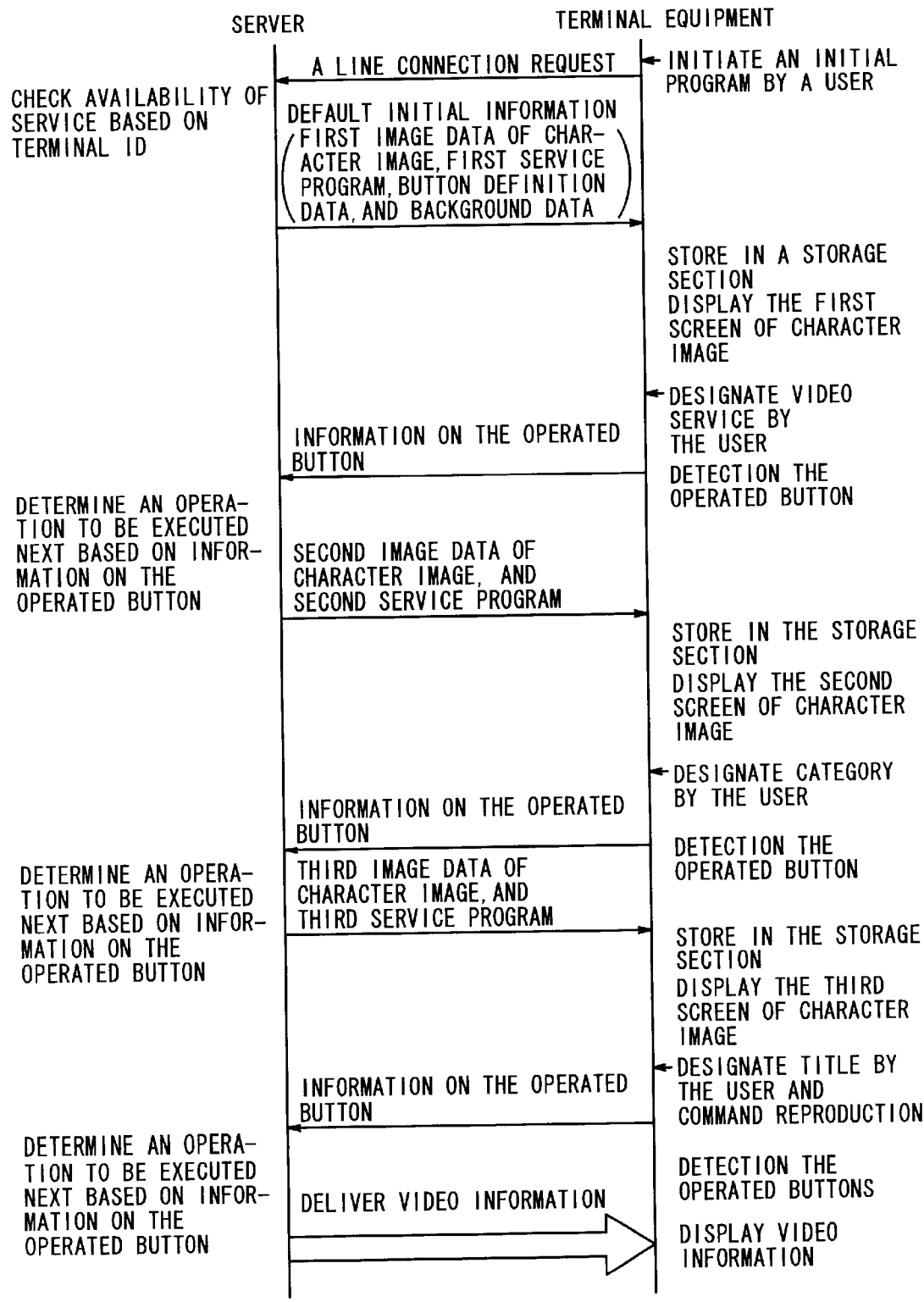
FIG. 16 is a sequence diagram showing the operation when a terminal equipment receives the service from the server for the first time using a default type of GUI.
Figure 17:
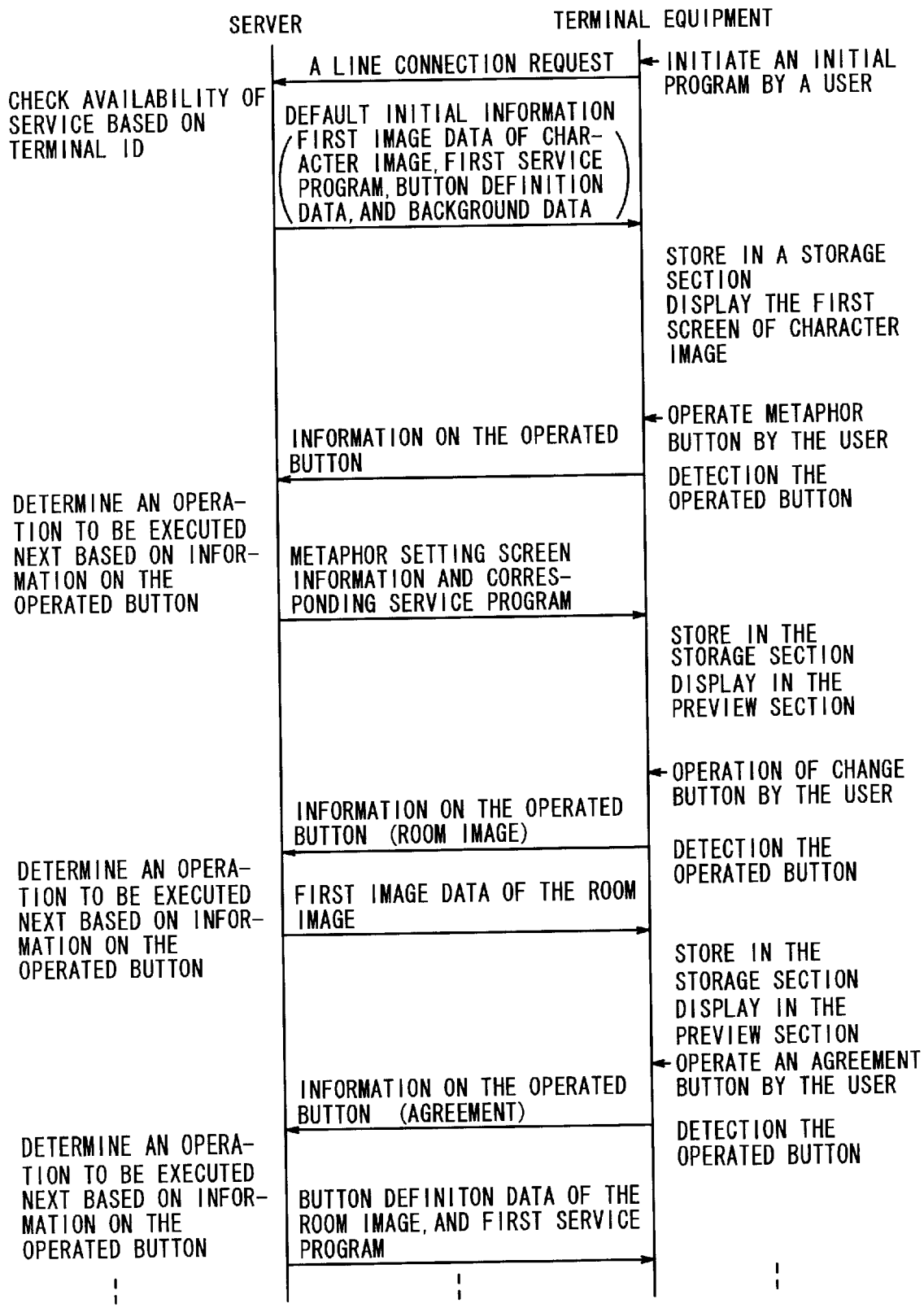
FIG. 17 is a sequence diagram showing the operation when the terminal equipment changes a type of GUI to be used.
Figure 18:
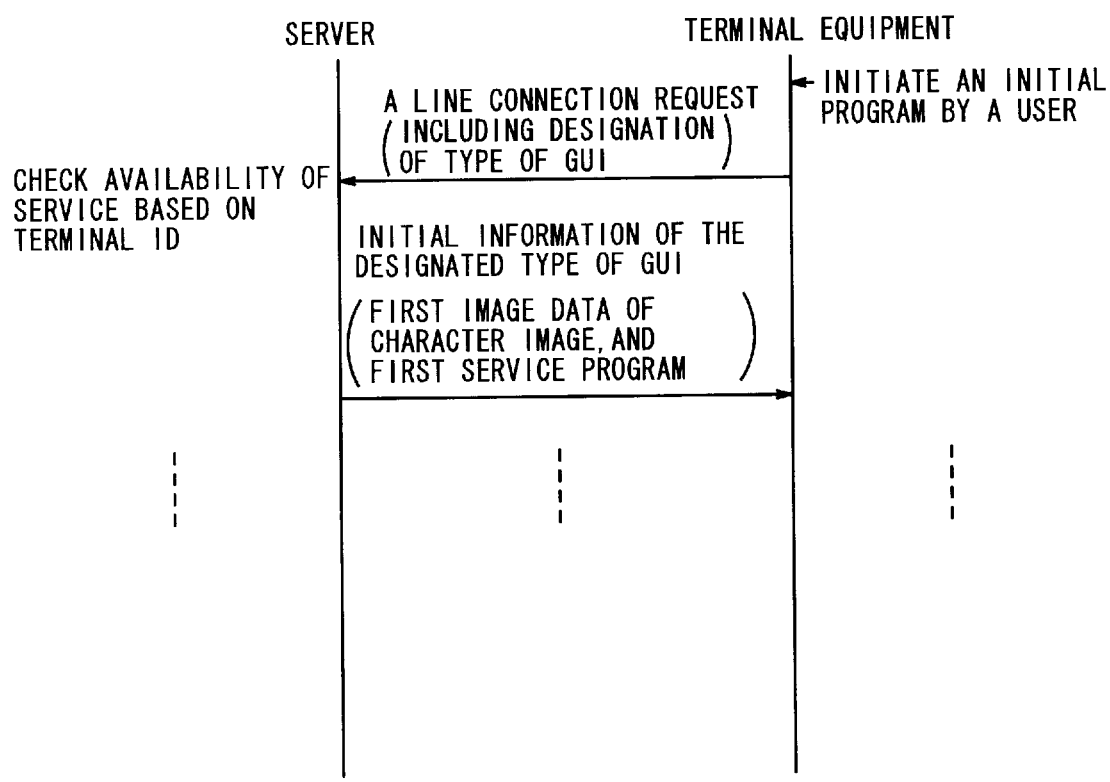
FIG. 18 is a sequence diagram showing the operation when the terminal equipment which has received the service from the server at least once receives the service from the server 1.

Next, the operation of the multi-media data communication system according to the embodiment of the present embodiment will be described below with reference to the drawings. FIG. 10 is a flow chart showing an example of processing of the initial program stored in the initial program storage section 226. FIG. 11 is a flow chart showing an example of processing of service programs 1214-1, 1214-2, 1224-1, 1224-2, 1234-1, and 1234-2 corresponding to the first and second image data. FIG. 12 is a flow chart of an example of processing of the final stage of service programs 1214-3, 1224-3, and 1234-3 corresponding to the third image data. FIG. 13 is a flow chart of processing of service programs 1216, 1226, and 1236 for metaphor setting corresponding to the metaphor setting screen image data 1215, 1225, and 1235. FIG. 14 is a flow chart of an example of processing on receiving a line connection request of the server 1. FIG. 15 is a flow chart of an example of processing in registering new type of GUI information in the storage section 12 of the server 1. FIG. 16 is a sequence diagram showing an example of operation in a case that a terminal equipment first receives the service from the server 1. FIG. 17 is a sequence diagram showing an example of operation in changing the type of GUI. FIG. 18 is a sequence diagram showing in a case that a terminal equipment which has once received service from the server 1 receives service from the server again.

First, the operation when the terminal equipment 2-1 receives the service from the server 1 for the first time will be described with reference to FIGS. 10, 11, 12, 14 and 16. In this example, it is assumed that the terminal equipment 2-1 receives the service of provision of video information.

In order for a user of the terminal equipment 2-1 to receive the service provided by the server 1, the user operates the operation section 25 to instruct initiation of the initial program. In response to the instruction, the execution section 23 initiates the initial program which is stored in the initial program storage section 226 of the storage section 22. When the initial program is initiated, the execution section 23 first reserves areas for the service screens storage section 221, the preview screen storage section 222, the service program storage sections 223 and 224, and the background data storage section 225 in the storage section 22 in accordance with the initial program in a step S1 of FIG. 10. Note that since the initial program storage section 226 and the button definition data storage section 227 are always present in the storage section 22, the areas for them are not necessary to be reserved in the step S1.

Next, the execution section 23 transmits to the server 1 a line connection request including a terminal ID of the terminal equipment 2-1 which is stored in the communication section 21, in accordance with the initial program in a step S2. If button definition data is stored in the button definition data storage section 227 of the storage section 22, the execution section 23 transmits to the server 1 the line connection request including a list character string 62 of the button definition data for designating the type of GUI, in addition to the terminal ID. In this case, however, since the terminal equipment 2-1 receives the service from the server 1 for the first time and no button definition data is stored in the button definition data storage section 227, the execution section 23 transmits the line connection request including only the terminal ID of the terminal equipment 2-1 via the bidirectional communication line 3, as shown in FIG. 16.

When receiving the above line connection request through the communication section 11, the control section 13 of the server 1 determines based on the terminal ID contained in the request whether the terminal equipment 2-1 is allowed to receive the service. The control section 13 executes line connection processing in a step S51 of FIG. 14 only when it is determined that the terminal equipment 2-1 is allowed to receive the service. Subsequently, the control section 13 transmits default initial information to the terminal equipment 2-1 in steps S52 and S53 because any list character string for designating the type of GUI is not included in the received line connection request as shown in FIG. 16. Here, the default initial information is composed of the first image data 1213-1 of a character image type of GUI, the first service program 1214-1, the button definition data 1212 for the character image type of GUI, and a background data designated by the name 64 of the background data in the button definition data 1212 in the embodiment. In addition, in a step S55, the control section 13 sets a level pointer in a memory (not shown) of the control section 13 such that the level pointer indicates that the terminal equipment 2-1 is in the state in which the default initial information is received. In this case, the level pointer has data of "1-1", i.e., the first "1" indicative of the character image type of GUI and the next "1" indicative of the service selection screen in the first level of the hierarchical structure.

Figure 3A:
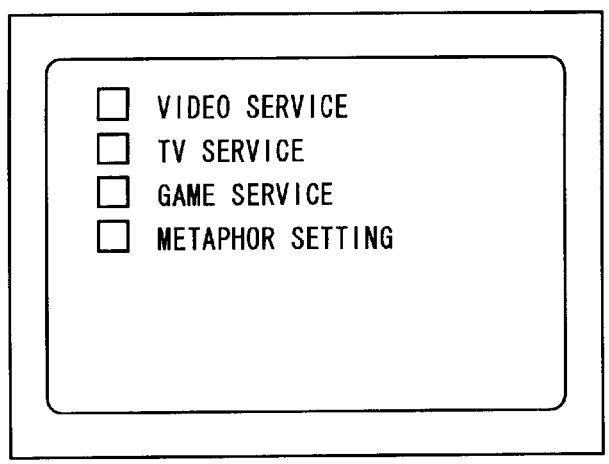
FIGS. 3A to 3C are diagrams showing metaphor images in a character image type of service selection screen displayed on a terminal equipment shown in FIG. 1.

When receiving the default initial information through the communication section 21 in a step S3 of FIG. 10, the execution section 23 of the terminal equipment 2-1 stores the first image data 1212-1 for the character image type of GUI in the service screen storage section 221, the first service program 1214-1 for the service selection screen in the service program storage section 223, the button definition data 1212 in the button definition data storage section 227, and the background data in the background data storage section 225 in a step S4. Then, the execution section 23 initiates the service program 1214-1 stored in the service program storage section 223 in a step S5. When initiating the service program 1214-1, the execution section 23 executes the following processing. That is, the execution section 23 first synthesizes the first image data 1212-1 for the character image type of GUI, the button definition data, and the background data and displays the synthesized image data on the display section 24 in a step S11 of FIG. 11. As a result, the service selection screen in the first level of the character image type of GUI is displayed on the display section 24 as shown in FIG. 3A. In FIG. 3A, four buttons, i.e., a video service button, a TV service button, a game service button, and a metaphor setting button are shown on the service selection screen and they correspond to the numbers 1 to 4 in the first level of the pushed button information—service program correspondency shown in FIG. 20.

The user of the terminal equipment 2-1 can select a desirable service by operating one of the buttons displayed on the service selection screen shown in FIG. 3A using the operation section 25. For instance, it is assumed that the user operates the "video service" button for receiving the desirable service with a cursor using the mouse of the operation section 25. When it is detected in a step S12 that the button is operated, the execution section 23 determines the name of the operated button. Which one of the buttons displayed in the service selection screen shown in FIG. 3A is operated can be detected based on the button definition data 1212 stored in the button definition data storage section 227. That is, the operated button can be detected by determining that a position designated by the cursor falls within which one of the button areas defined by the button definition data 1212. The executing section 23 transmits to the server 1 information on the operated button including the name of the operated button in a step S13, as shown in FIG. 16.

When receiving the operated button information through the communication section 11 in a step S56 of FIG. 14, the control section 13 of the server 1 determines processing to be executed next from the state of the terminal equipment set in the memory, i.e., the level pointer and the operated button information in a step S59. That is, since the level pointer currently indicates "1-1" and the operated button information includes data indicative of "video service" corresponding to "2" of the first level in FIG. 20, the control section 13 can determine the transmission processing of the second image data 1213-2 and the second service program 1214-2 corresponding to the second image delta 1213-2 as the processing to be executed next in association with the video service in the second level of the character image type of GUI. Note that the button definition data and background data is not transmitted because the button definition data covers all the level of the character image type of GUI and the background data is common between all the levels. The control section 13 executes the determined processing in a step S60 as shown in FIG. 16. Then, the control section 13 updates the level pointer indicative of the state of the terminal equipment 2-1 in a step S61 such that the level pointer indicates that the terminal equipment 2-1 is in the state in which the second image data for the character image type of GUI is received. As a result, the level pointer has "1-2", i.e., "1" indicative of the character image and "2" indicative of a second level of service selection screen, e.g., the category selection screen in the example.

Figure 3B:
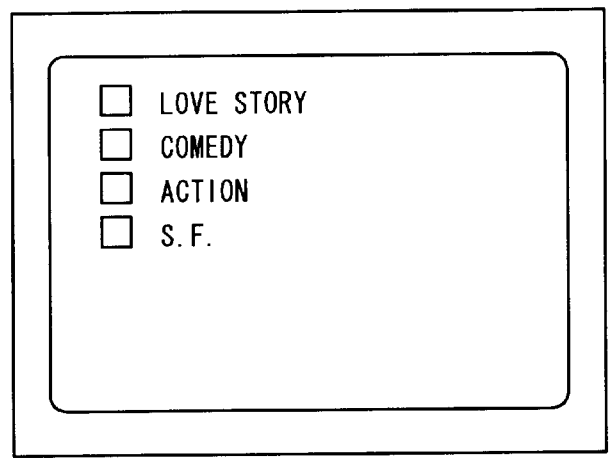

When receiving the above second image data and service program through the communication section 21, the execution section 23 of the terminal equipment 2-1 stores the second image data 1212-2 in the service screen storage section 221 and the second service program in the service program storage section 224 in a step S14 of FIG. 11. Subsequently, the execution section 23 initiates the received second service program 1214-2 in a step S15. When the second service program 1214-2 is initiated, the execution section 23 executes to first synthesize the second image data 1212-2 stored in the service screen storage section 221, the background data stored in the background data storage section 225, and the button image obtained from the button definition data stored in the storage section 227 and displays the synthesized image on the display section 24 in the step S11 of FIG. 11. As a result, the category selection screen in the second level of the character image type of GUI is displayed on the display section 24 as shown in FIG. 3B. As shown in FIG. 3B, four buttons for designating the category of video service, i.e., "love story", "comedy", "action", and "science fiction" are displayed on the display section 24. The user of the terminal equipment 2-1 can select a desirable category of video service using the category selection screen shown in FIG. 3B. In this case, it is assumed that the user operates the "action" button for selecting the desirable category of video service. The operated button is determined in the same manner as described above. When it is detected that the action button is operated, the execution section 23 transmits operated button information indicative of the operation of the action button to the server 1 in the step S13, as shown in FIG. 16.

When receiving the operated button information, the control section 13 of the server 1 executes the processing determined in accordance with the state of the terminal equipment 2-1 set in the memory and the operated button information. That is, the control section 13 executes the processing for transmitting to the terminal equipment 2-1 the third image data 1213-3 associated with the action button and the service program 1214-3 corresponding to the third image data 1213-3 in the steps S59 and S60. Then, in the step S61, the control section 13 updates the state of the terminal equipment 2-1 set in the memory to indicate that the terminal equipment 2-1 is in the state in which the third image data of character image is received. In this case, the level pointer indicates "1-3". Here, "3" indicates the third level.

When receiving the above third image data 1213-3 and service program 1214-3, the execution section 23 of the terminal equipment 2-1 stores the third image data 1213-3 associated with the titles of video movies for video service in the service screen storage section 221 and the third service program 1214-3 in the service program storage section 223. Subsequently, the execution section 23 initiates the received third service program 1214-3 in the steps S14 and S15 of FIG. 11. When the third service program 1214-3 is initiated, the execution section 23 executes to first synthesize the third image data 1213-3 stored in the service screen storage section 221, the button definition data 1212 and the background data stored in the background data storage section 225 and displays the synthesized image on the display section 24 in the step S21 of FIG. 12. As a result, the title selection screen is displayed on the display section 24 as shown in FIG. 3C.

Figure 3C:
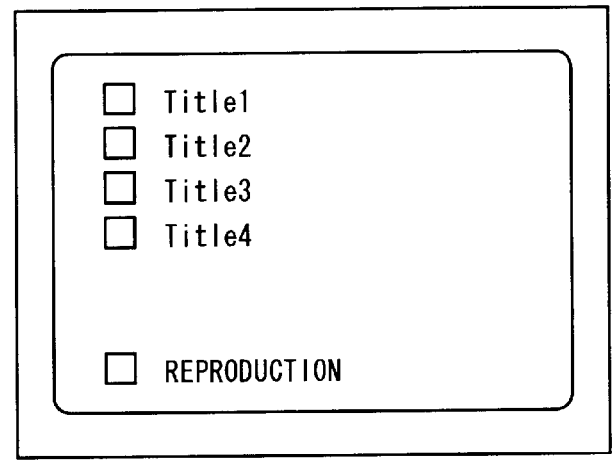

When the user of the terminal equipment 2-1 chooses a desirable title of video service using the title selection screen shown in FIG. 3C, for instance, in a case that the video of "Title 3" is desirable, a button corresponding to the "Title 3" is operated and further a reproduction button is operated. When it is detected that the button corresponding to the "Title 3" and the reproduction button are operated in the step S22, the execution section 23 transmits operated button information indicative of the operation of the buttons to the server 1 in the step S23, as shown in FIG. 16. Thereafter, in the step S24, the terminal equipment 2-1 is set in the state in which the video information can be received.

When receiving the operated button information through the communication section 11, the control section 13 of the server 1 executes the processing determined in accordance with the state of the terminal equipment 2-1 set in the memory and the operated button information using the level pointer. That is, the control section 13 executes the processing for delivering to the terminal equipment 2-1 an action video movie, i.e., one designated by the operated button information of video sources stored in the service source storage section 12B of the storage section 12 in the steps S59 and S60 of FIG. 14, as shown in FIG. 16. As a result, the desired video movie is displayed on the display section 24 of the terminal equipment 2-1. Then, when the video source is delivered to the terminal equipment 2-1, the control section 13 updates the state of the terminal equipment 2-1 set in the memory in the step S61 to indicate that the terminal equipment 2-1 is in the state in which the video movie is delivered. That is, the level pointer is set to "1-3".

When making the currently provided service end, the user of the terminal equipment 2-1 operates the operation section 25 to input this. Thereby, the execution section 23 transmits a line disconnection request to the server 1. When receiving the line disconnection request, the control section 13 of the server 1 executes the line disconnection processing in steps S57 and S58 of FIG. 14 to end the provision of the video service to the terminal equipment 2-1.

The above mentioned operation is in a case that the terminal equipment 2-1 receives the service from the server 1 for the first time. The following operation is executed for the second time and the subsequent. The operation will be described with reference to the FIG. 18.

In a case of receiving the service by the server 1, the execution section 23 of the terminal equipment 2-1 reserves areas for the service screens storage section 221, the preview screen storage section 222, the service program storage sections 223 and 224, the background data storage section 225, and the metaphor setting screen information storage section 228 in the storage section 22 in accordance with the initial program stored in the initial program storage section 226, as described above in the step S1 of FIG. 10.

Next, the execution section 23 transmits a line connection request including the terminal ID of the terminal equipment 2-1 to the server 1 in the step S2, as shown in FIG. 18. In this case, since the button definition data of the type of GUI used at the previous time (which is assumed to be the character image type of GUI) is stored in the button definition data storage section 227 of the storage section 22, the designation of the type of GUI, i.e., the "character image" is included in the above line connection request.

When receiving the above line connection request, the control section 13 of the server 1 determines based on the terminal ID contained in the request whether the terminal equipment 2-1 is allowed to receive the service. In the step S51 of FIG. 14, the control section 13 executes line connection processing only when it is determined that the terminal equipment 2-1 is allowed to receive the service. Next, as shown in FIG. 18, the control section 13 transmits initial information of the designated type of GUI, i.e., initial information of character image type of GUI to the terminal equipment 2-1 because the designation of the type of GUI is included in the line connection request in the step S54. Here, the above initial information is composed of the first image data 1213-1 of the character image type of GUI and the first service program 1214-1 corresponding to the first image data 1213-1.

When receiving the above initial information in the step S3 of FIG. 10, the execution section 23 of the terminal equipment 2-1 executes the same processing as described above with reference to FIG. 16.

In the above-mentioned example, the case that the terminal equipment receives the service provided by the server 1 using the default type of GUI, i.e., a character image type of GUI. However, there is a case that the user of the terminal equipment is not easy to operate the character image type of GUI. In such a case, the user of the terminal equipment 2-1 can change the type of GUI to be used from the default type of GUI to a new type of GUI having the same function as and different metaphor images from the default type of GUI by executing the following operation. The operation will be described with reference to FIG. 17.

In a case that the terminal equipment 2-1 now receives the service provided by the server 1 for the first time, the same processing as described above is executed by transmitting a line connection request from the terminal equipment 2-1 to the server 1. Thereby, the button definition data 1212 is stored in the button definition data storage section 227, the first image data 1213-1 of the character image is stored in the service screen storage section 221, the first service program 1214-1 is stored in the service program storage section 223, and the background data is stored in the background data storage section 225. Further, the service selection screen is displayed on the display section 24 as shown in FIG. 3A in the steps S1 to S5 of FIG. 10 and the step S11 of FIG. 11.

Next, the user of the terminal equipment 2-1 operates a metaphor setting button in the service selection screen shown in FIG. 3A if the type of GUI is to be changed from the character image to another image. When it is detected in the step S12 of FIG. 11 that the metaphor setting button is operated, the execution section 23 transmits operated button information indicative of the operation of the button to the server 1 in the step S13, as shown in FIG. 17.

When receiving the operated button information, the control section 13 of the server 1 transmits the metaphor setting screen information and a service program 1216 to the terminal equipment 2-1 in steps S59 and S60 of FIG. 14, as shown in FIG. 17. Here, the metaphor setting screen information is composed of an image data 1215 of the metaphor setting screen and list character strings 62 in the check sheet stored in the check sheet storage section 12, i.e., "character image", "room image", and "town image". Then, in the step S61, the control section 13 updates the state of the terminal equipment 2-1 set in the memory to indicate that the terminal equipment 2-1 is in the state in which the metaphor setting screen information is received. That is, the level pointer is "1-2".

Figure 19:
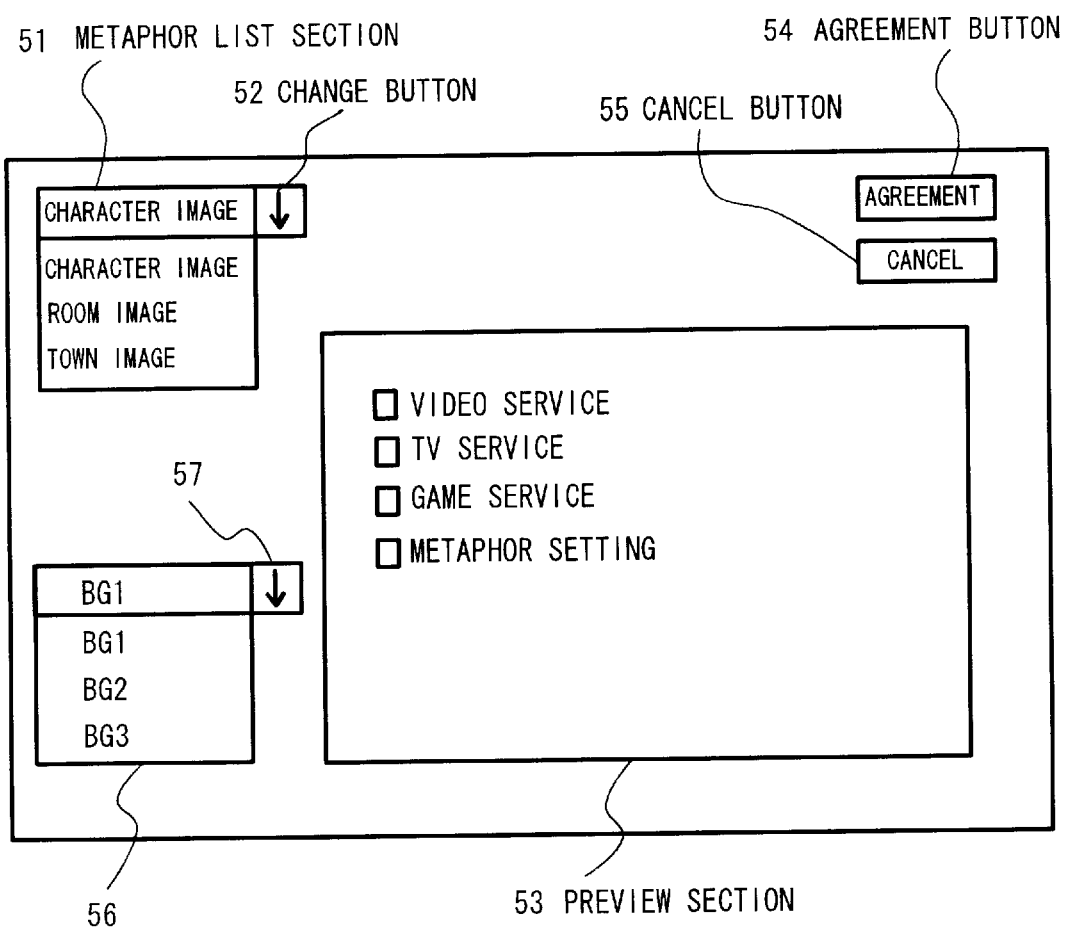
FIG. 19 is a diagram showing an example of metaphor setting screen.

When receiving the above information and service program, the execution section 23 of the terminal equipment 2-1 stores the metaphor setting screen information in the metaphor setting screen information storage section 228 of the storage section 22 and the service program 1216 in the service program storage section 224 in the step S14. Subsequently, the execution section 23 initiates the metaphor setting service program 1216 in the received data. When the service program 1216 is initiated, the execution section 23 executes processing in accordance with the service program to first display the metaphor setting screen shown in FIG. 19 in the step S31 of FIG. 13. That is, the execution section 23 displays the frame of the metaphor list section 51, the frame of the preview section 53, a change button 52, an agreement button 54, a cancel button 55 of the metaphor setting screen, and the frame of a background list section 57 based on the metaphor setting screen image data 1215 stored in the metaphor setting screen information storage section 228. Then, the execution section 23 displays list character strings 62 and list background strings 64 stored in the metaphor setting screen information storage section 228 in the metaphor list section 51. The first image data 1213-1 of the character image type GUI stored in the service screen storage section 221 is displayed in the preview section 53, the type of the GUI currently displayed in the preview section 53 in the head portion of the metaphor list section 51, and a name list 64 of background data currently displayed in the preview section 53 in the head portion of the background list section 56. Next, the user of the terminal equipment 2-1 operates the metaphor change button 52 to choose a desirable type of GUI to be used when the metaphor setting screen is displayed as shown in FIG. 19. Now, for instance, in a case the room image type of GUI is to be used, the user operates the change button 52 and chooses the room image by use of the change button 52. Also, the user of the terminal equipment 2-1 operates the background change button 57 to choose a background for the desirable type of GUI to be used. Now, for instance, the user operates the change button 57 and chooses the background data BG1. When it is detected that the room image is chosen, the execution section 23 transmits operated button information indicative of the operation of the buttons to the server 1 in the steps S32 and S35, as shown in FIG. 17

The control section 13 of the server 1 transmits the first image data 1223-1 of the room image to the terminal equipment 2-1 in the steps S59 and S60 of FIG. 14, as shown in FIG. 17.

Figure 5:
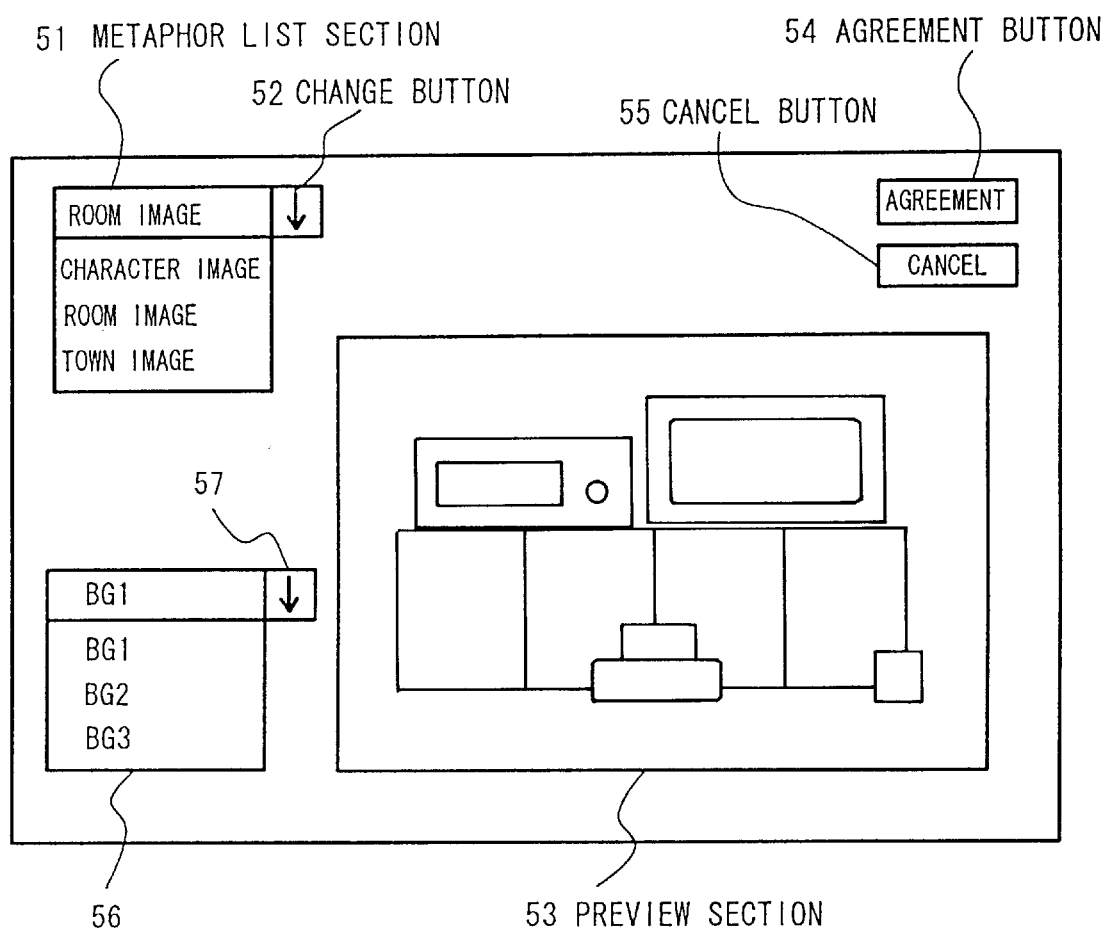
FIG. 5 is a diagram showing a metaphor setting screen for selecting a metaphor image of service selection screen.

The execution section 23 of the terminal equipment 2-1 stores the transmitted first image data 1223-1 in the preview image storage section 222 of the storage section 22 and at the same displays it in the preview section 53 of the metaphor setting screen. Further, the execution section 23 displays the list character string indicative of the type of the GUI currently displayed in the preview section 53 in the head portion of the metaphor list section 51 in the step S36 of FIG. 13. Also, the execution section 23 displays the list background strings indicative of the background of the type of the GUI currently displayed in the preview section 53 in the head portion of the background list section 56 in the step S36 of FIG. 13. Thereby, the metaphor setting screen is displayed on the display section 24 as shown in FIG. 5. In FIG. 5, the metaphor selection screen for the room image type GUI is displayed based on the image data 1225. The image data 1225 for the metaphor selection screen includes a data for displaying the frame section of the metaphor list section 51, the change button 52, the frame section of a preview section 53, the agreement button 54, the cancel button 55, and the frame section of a background list section 56. In this case, the first image data 1223-1 of the room image type of GUI is displayed in the preview section 53 and the list character string (the room image) indicative of the type of the GUI currently displayed in the preview section 53 is displayed in the head portion of the metaphor list section 51.

Next, viewing the room image type of. GUI displayed in the preview section 53, the user of the terminal equipment 2-1 operates the agreement button 54 when the room image type of GUI is determined to be used hereinafter. When it is detected that the agreement button 54 is operated, the execution section 23 stores the first image data 1223-1 of the room image type of GUI stored in the preview screen storage section 222 of the storage section 22 in the service screen storage section 221 in the steps of S33 and S37. Further, the execution section 23 transmits operated button information indicative of the operation of the agreement button 54 to the server 1 in the step S38.

When receiving the operated button information, the control section 13 of the server 1 transmits to the terminal equipment 2-1 the button definition data 1222 of the room image and the first service program 1224-1 of the room image in the steps S59 and S60 of FIG. 14 as shown in FIG. 17.

Figure 7A:
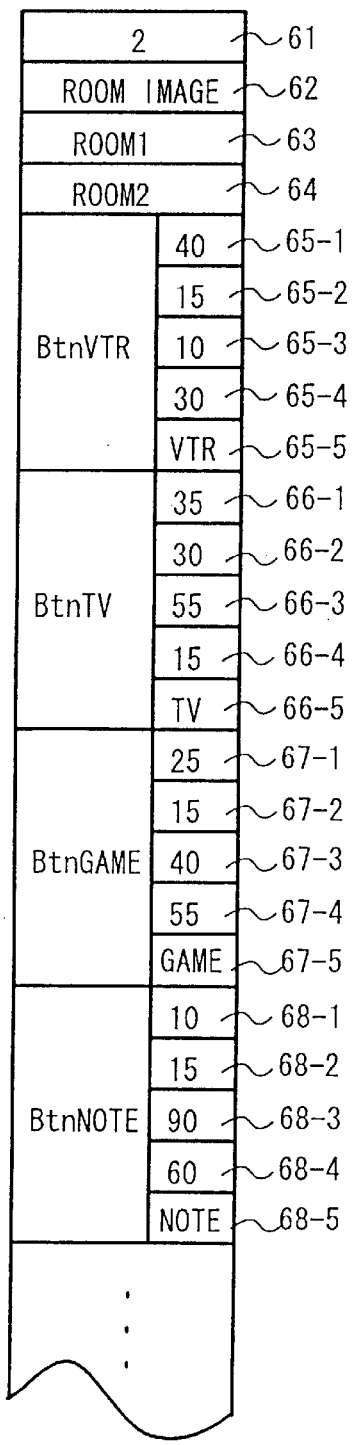
FIG. 7A is a diagram indicative of the detail of the button definition data and FIG. 7B is a diagram indicative of a metaphor image of service selection screen corresponding to the button definition data shown in FIG. 7A.
Figure 7B:
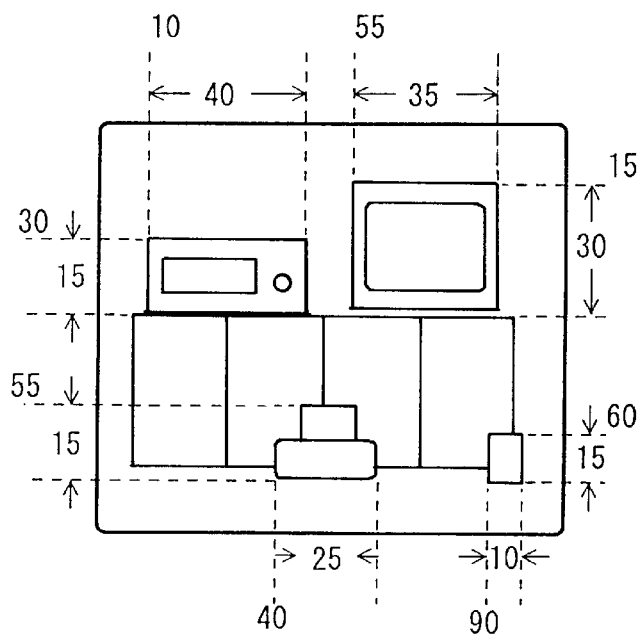

FIG. 7 is a diagram showing a detail example of button definition data 1222 of the GUI information 122. The example shown in FIG. 7A corresponds to the room image as shown in FIG. 7B. "2" is set in the registration number 61 of the button definition data 1222, "room image" is set in the list character string 62, "ROOM1" is in the preview data 63, and "ROOM2" is set in the name of background data 64. Further, in the names of the buttons 65, 66, ... are set the names of buttons BtnVTR, BtnTV, ... in the various service screens of the room image shown in FIGS. 4A to 4C and metaphor setting screen shown in FIG. 5. The width, height, X-coordinate value, Y-coordinate value and button data of each button are set in correspondence to the name of the button. For instance, with the button having the name of "BtuVTR", "40" is set in the button width 65-1, "15" in the button height 65-2, "10" in the X-coordinate value 65-3 of the button, "30" in the Y-coordinate value 65-4 of the button, and "VTR" in the button data 65-5.

Figure 4A:
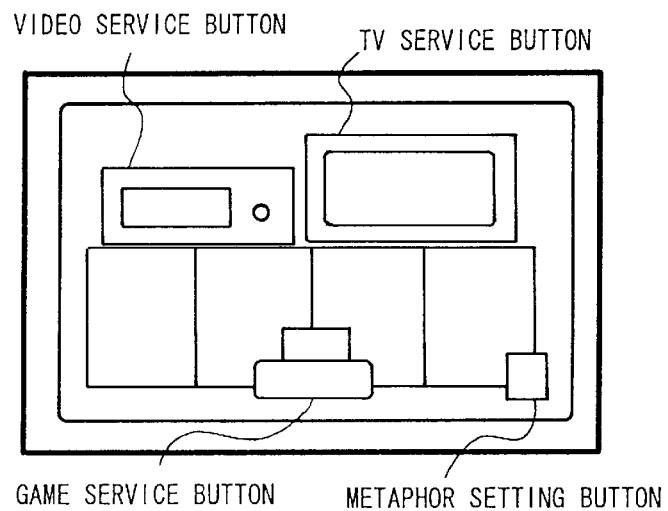
FIGS. 4A to 4C are diagrams showing metaphor images in a room image type of service screen corresponding to the character image type of service selection screen shown in FIGS. 3A to 3C.

When receiving the above data and service program, the execution section 23 of the terminal equipment 2-1 stores the button definition data 1222 in the button definition data storage section 227 of the storage section 22 and the first service program 1224-1 in the service program storage section 223 in the step S39. Then, the metaphor setting screen is closed in the step S40 of FIG. 13. Further, the execution section 23 initiates the received first service program 1224-1 in the steps S41. Thereby, the service screen is displayed on the display section 24 based on the first image data 1223-1 of the room image type of GUI, as shown in FIG. 4A in the step S11 of FIG. 11. At the time when the room image type of GUI is displayed on the display section 24 in the step S36, if the user of the terminal equipment 2-1 determines that the operation is not easy even by the room image type of GUI, the user can operate the change button 52 again to choose the town image type of GUI. Thereby, the same processing as described above is executed and the first image data 1233-1 of the town image type of GUI is displayed in the preview section 53. If it is determined that the town image type of GUI is easy to operate, the agreement button 54 is operated. Further, if the user determines that the town image type of GUI displayed in the preview section 53 is also not easy to operate and the character image type of GUI is the easiest to operate, the user can operate the cancel button 55. When it is detected that the cancel button 55 is operated, the execution section 23 closes the metaphor setting screen and then initiates the original service program 1214-1 stored in the service program storage section 223 in the steps S34, S42 and S43.

Figure 4B:
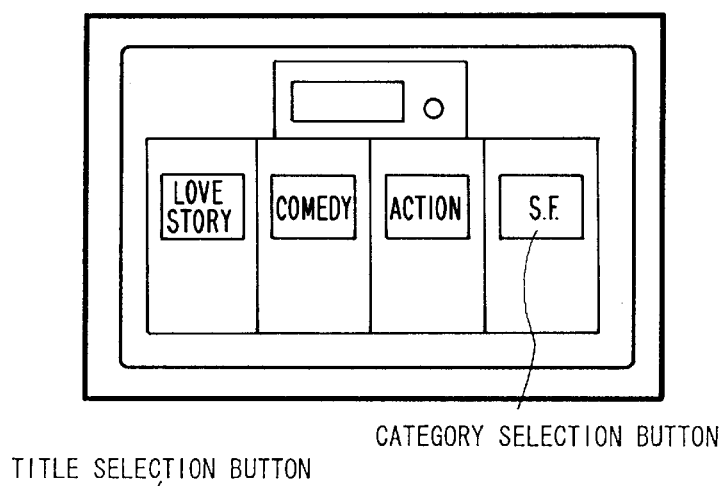
Figure 4C:
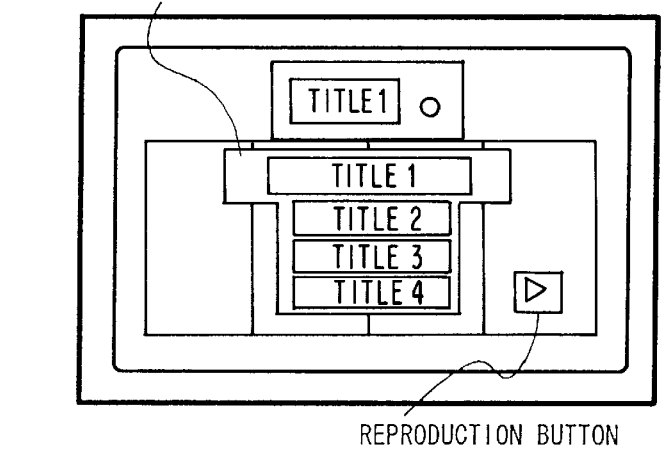

When the room image type of GUI is selected, the service selection screen of the first level is displayed based on the first image data 1223-1 of the room image type of GUI as shown in FIG. 4A. As shown in FIG. 4B, the category selection screen of the second level is displayed based on the second image data 1223-2 of the room image type of GUI after the video service is selected on the service selection screen shown in FIG. 4A. When the action button is operated on the category selection screen shown in FIG. 4B, a title selection screen of the third level is displayed based on the third image data 1223-3 of the room image type of GUI as shown in FIG. 4C. In this manner, even if the metaphor image is changed, the user can receive the same service as in a case of the character image type of GUI with the same operation.

Next, the operation when the new type of GUI information is added and registered in the storage section 12 of the server 1 will be described below.

In a case of additionally registering the new type of GUI information in the storage section 12, a manager or service provider of the server 1 inputs a registration instruction from the input section 14 and then a type of GUI information to be newly added and registered from the input section 14. When the registration instruction is inputted, the control section 13 of the server 1 reserves an area for the new type of GUI information to be stored in the storage section 12 in a step S71 of FIG. 15. Subsequently, the control section 13 stores the new type of GUI information in the reserved area in a step S72.

Next, the control section 13 acquires the last number of the registration number 81 in the check sheet stored in the check sheet storage section 12C as shown in FIG. 8, e.g., "3" in this embodiment in a step S73, and assigns a number next to the acquired last number as the registration number of the button definition data contained in the newly registered type of GUI information in a step S74. Then, the control section 13 adds and registers the list character string and the registration number of the button definition data in the check sheet stored in the check sheet storage section 12C in a step S75.

In the above embodiments, a service program is provided for each of the types of GUI information. However, in case that the program can be commonly used between the types of GUI information, one service program may be provided for all the types of GUI information. Further, in the embodiment, in a case that a terminal equipment receives service by the server, in order to allow the terminal equipment to receive the service using the same type of GUI as used previously, the button definition data is stored in the storage section of the terminal equipment and a line connection request including a list character string of the button definition data is transmitted to the server in currently receiving the service from the server. However, the server manages the type of GUI used previously by each terminal equipment and the server may allow the terminal equipment to use the previously used type of GUI based on the management information of the terminal equipment when receiving the line connection request from the terminal equipment.

In addition, in the embodiment, the button definition data is transmitted once with the first image data. However, a piece of the button definition data may be transmitted together with the set of image data and service program. In this case, the storage area of the terminal equipment can be reduced. In the embodiment, when the button is operated, the name of the operated button is detected on the side of terminal equipment. However, the terminal equipment may transmit the position of the cursor position upon operation of the button. In this case, the detection operation must be executed on the side of server but the terminal equipment can be simplified in the structure. Furthermore, the new type of GUI is added through the input section 14. However, if the same operation is executed through the communication section 21 of the terminal equipment, the new type of Gui can be registered from the terminal equipment.

As described above, according to the present invention, information for establishing on the terminal equipment either one of a plurality of types of GUI having different metaphor but the same function is registered in the storage section of the server. When change of the type of GUI is requested from the terminal equipment, the control section reads out information for establishing a designated type of GUI from the storage section and to transmits the same. Therefore, the user of the terminal equipment can choose the easiest one to operate from among a plurality of types of GUI.

In addition, in the present invention, the terminal equipment includes the storage section for storing the type of GUI used previously. A line connection request including the designation of the type of GUI stored in the storage section is transmitted in requesting line connection to the server. Therefore, the type of GUI used previously can be used currently.

In the present invention, adding and registering means is provided to add and register information for realizing a new type of GUI into the storage section of the server. Therefore, the new type of GUI can be also chosen by the terminal equipment.

What is claimed is:

1. A multi-media data communication system comprising:
    a server having a plurality of graphic user interface (GUI) structures which are different in metaphor image from each other but function to provide the same service, for transmitting a specific one of said plurality of GUI structures in response to an inputted service request including an identifier data for designating one GUI structure, and for providing a specific service designated based on said transmitted GUI structure; and
    a plurality of terminal equipments that are connected to said server via a bidirectional communication line and each of which is capable of issuing the service request, wherein a request issuing terminal equipment of said plurality of terminal equipments issues the service request including the identifier data to said server via said bidirectional communication line, receives said GUI structure transmitted from said server to establish a GUI, designates said specific service using the established GUI, and receives said specific service from said server,
    wherein one of the plurality of graphic user interface structures which are different in metaphor image from each other but function to provide the same service is selectable by a user of one of said plurality of terminal equipments by the user making a selection on a display screen provided on said one of said plurality of terminal equipments in response to a metaphor change request outputted from said one of said plurality of terminal equipments.

2. A multi-media data communication system according to claim 1, wherein said server transmits a default one of said plurality of GUI structures only in response to an inputted service request with no identifier data for designating one GUI structure.

3. A multi-media data communication system according to claim 2, wherein each of said plurality of GUI structures has one identifier data for designating said GUI structure,
    wherein when receiving said GUI structure transmitted from said server, said request issuing terminal equipment stores the identifier data contained in said transmitted GUI structure, and
    wherein the stored identifier data is used for a next issuance of the service request by said request issuing terminal equipment.

4. A multi-media data communication system according to claim 1, wherein said server further includes a metaphor changing structure, transmits said metaphor changing structure to said request issuing terminal equipment together with a list of GUI designating data for said plurality of GUI structures in response to the metaphor change request, and transmits to said request issuing terminal equipment a new GUI structure finally designated by said request issuing terminal equipment, and
    wherein said request issuing terminal equipment issues the metaphor changing request to said server, and selects one of the GUI designating data for said plurality of GUI structures in accordance with said metaphor changing structure to finally designate the new GUI structure.

5. A multi-media data communication system according to claim 4, wherein said request issuing terminal equipment issues, for finally designating the new GUI structure, to said server a sample request for designating one of said plurality of GUI structures in accordance with said metaphor changing structure and the list of GUI designating data for of said plurality of GUI structures, and wherein said server transmits to said request issuing terminal equipment a part of one GUI structure designated by the sample request from said request issuing terminal equipment, and then transmits to said request issuing terminal equipment the remaining part of GUI structure finally designated by said request issuing terminal equipment.

6. A multi-media data communication system according to claim 4, wherein said plurality of GUI structures include a room image, a town image and a character image, wherein said plurality of GUI structures are individually selectable by a user from a single display screen of said request issuing terminal equipment based on a particular GUI structure provided to said request issuing terminal equipment by said server in response to the metaphor changing request issued by said request issuing terminal equipment, and wherein said user is allowed to change to a particular one of said plurality GUI structures in order to select one of said plurality of GUI structures for said request issuing terminal equipment.

7. A multi-media data communication system according to claim 1, wherein each of said plurality of GUI structures has a hierarchical structure composed of a plurality of layers, each of which includes an image data for each of said plurality of layers and a service program corresponding to the image data.

8. A multi-media data communication system according to claim 7, wherein said server further includes a section for registering an additional GUI structure newly produced in said server.

9. A multi-media data communication system according to claim 1, wherein said request issuing terminal equipment further includes a section for modifying the GUI structure transmitted from said server and registering the modified GUI structure in said server.

10. A method of providing a service using a user friendly type of graphic user interface (GUI) in a multimedia data communication system, comprising the steps of:

providing in a server a plurality of GUI hierarchical structures which are different in metaphor image from each other but function to provide the same service, wherein each of said plurality of GUI hierarchical structures is composed of GUI structures of a plurality of layers and each of said GUI structures is composed of an image data and control program;

issuing a service request including a metaphor designating data for designing a specific one of said plurality of GUI hierarchical structures and a terminal identifier of a request issuing terminal equipment of a plurality of terminal equipments from said request issuing terminal equipment to said server, the service request being made based on a selection by a user of the specific one of said plurality of GUI hierarchical structures from a display of a list of said plurality of GUI hierarchical structures on a display screen of said request issuing terminal equipment;

determining in said server whether said request issuing terminal equipment is allowed to receive a service and whether the service request includes the metaphor designating data when it is determined that said request issuing terminal equipment is allowed to receive said service;

transmitting the GUI structures of the specific one of said plurality of GUI hierarchical structures designated by the metaphor designating data from said server to said request issuing terminal equipment in response to the service request when the service request includes the metaphor designating data;

designating a specific service through the transmission of the GUI structures from said server and selections in said request issuing terminal equipment;

providing to said request issuing terminal equipment the specific service designated by said request issuing terminal equipment based on said transmitted GUI structures; and receiving said specific service from said server in said request issuing terminal equipment.

11. A method according to claim 10, further comprising the step of transmitting one GUI hierarchical structure in a top layer of a default one of said plurality of GUI structures in response to the service request when it is determined that the service request includes no metaphor designating data.

12. A method according to claim 11, further comprising the step of storing the metaphor designating data contained in the transmitted GUI hierarchical structure in said request issuing terminal equipment for the next service request.

13. A method according to claim 10, further comprising the steps of:

issuing a metaphor changing request from said request issuing terminal equipment to said server;

transmitting a metaphor changing structure from said server to said request issuing terminal equipment together with a list of metaphor designating data of said plurality of GUI hierarchical structures in response to the metaphor changing request; and transmitting from said server to said request issuing terminal equipment a new GUI structure finally designated by said request issuing terminal equipment using the list of metaphor designating data of said plurality of GUI hierarchical structures and said metaphor changing structure.

14. A method according to claim 10, further comprising the step of registering an additional GUI structure in said server.

15. A multi-media data communication system comprising:

a server having a plurality of graphic user interface (GUI) structures which are different in metaphor image from each other but function to provide the same service, wherein each of said plurality of GUI structures has a hierarchical structure composed of a plurality of layers, wherein each of said plurality of GUI structures has a plurality of selection paths to each of which a set of image data and service program corresponding to the image data is provided, and wherein said server sequentially transmits sets of image data and service program for the plurality of layers in a specific one of said plurality of GUI structures in response to an inputted service request including GUI designating data for designating one GUI structure and selections in each of the plurality of layers, and provides a specific service designated based on said transmitted GUI structure; and a plurality of terminal equipments which are connected to said server via a bidirectional communication line and each of which is capable of issuing the service requests, wherein a request issuing terminal equipment of said plurality of terminal equipments issues the service request to said server via said bidirectional communication line, sequentially receives the sets of image data and service program for the plurality of layers in the specific one of said plurality of GUI structures to execute the selections for the specific service using the received sets, and receives said specific service from said server.

16. A multi-media data communication system according to claim 15, wherein said server transmits a default one of said plurality of GUI structures in response to an inputted service request with no GUI designating data.

17. A multi-media data communication system according to claim 15, wherein said server further has a data indicative of a current layer and determines the set of image data and service program to be transmitted next, in accordance with said current layer data and the selection in the current layer.

18. A multi-media data communication system according to claim 15, wherein said server further includes a metaphor changing structure, transmits said metaphor changing structure to said request issuing terminal equipment together with a list of GUI designating data of said plurality of GUI structures in response to a metaphor change request, and transmits to said request issuing terminal equipment a new GUI structure finally designated by said request issuing terminal equipment, and wherein said request issuing terminal equipment issues the metaphor changing request to said server, selects one of the GUI designating data of said plurality of GUI structures in accordance with said metaphor changing structure to finally designate the new GUI structure.

19. A multi-media data communication system according to claim 15, wherein said server further includes a section for registering an additional GUI structure in said server.

20. A multi-media data communication system according to claim 15, wherein said request issuing terminal equipment further includes a section for registering an additional GUI structure in said server.

\* \* \* \* \*